(12) United States Patent
Lum

(10) Patent No.: US 6,312,175 B1
(45) Date of Patent: Nov. 6, 2001

(54) INTEGRATED KEYBOARD INPUT DEVICE

(75) Inventor: Jackson Lum, Roslyn, NY (US)

(73) Assignee: Logic Controls, Inc., New Hyde Park, NY (US)

( * ) Notice: Subject to any disclaimer, the term of this patent is extended or adjusted under 35 U.S.C. 154(b) by 0 days.

(21) Appl. No.: 09/282,286

(22) Filed: Mar. 31, 1999

Related U.S. Application Data

(60) Provisional application No. 60/080,084, filed on Mar. 31, 1998, provisional application No. 60/083,844, filed on May 1, 1998, provisional application No. 60/087,457, filed on Jun. 1, 1998, and provisional application No. 60/105,157, filed on Oct. 21, 1998.

(51) Int. Cl.$^7$ ........................................................ B41J 5/10
(52) U.S. Cl. ............................................ 400/472; 400/477
(58) Field of Search ..................................... 400/472, 477, 400/478, 479; 235/145 R

(56) References Cited

U.S. PATENT DOCUMENTS

| | | |
|---|---|---|
| 3,494,550 | 2/1970 | Hayes et al. ..................... 235/145 R |
| 3,548,160 | 12/1970 | Welsh ................................. 235/61.6 |
| 3,974,496 | 8/1976 | Aptroot-Soloway ................. 340/337 |
| 4,490,604 | 12/1984 | Read et al. ............................ 235/146 |
| 4,859,839 | 8/1989 | Tetelman et al. ..................... 235/385 |
| 4,988,851 | 1/1991 | Kohno et al. ......................... 235/462 |
| 5,019,694 | 5/1991 | Collins, Jr. ............................ 235/383 |
| 5,021,640 | 6/1991 | Muroi ................................... 235/462 |
| 5,026,975 | 6/1991 | Guber et al. .......................... 235/462 |
| 5,047,615 | 9/1991 | Fukumoto et al. ................... 235/432 |
| 5,079,412 | 1/1992 | Sugiyama ............................. 235/383 |
| 5,113,060 | 5/1992 | Wike, Jr. et al. ..................... 235/383 |
| 5,159,180 | 10/1992 | Feiler ................................... 235/375 |
| 5,189,291 | 2/1993 | Siemiatkowski ..................... 235/472 |
| 5,207,294 | 5/1993 | Kurimoto et al. ....................... 186/61 |
| 5,470,040 | * 11/1995 | Bhagat et al. ....................... 248/222.4 |
| 5,523,755 | * 6/1996 | Wooten ................................. 400/479 |
| 5,541,397 | 7/1996 | Walts ................................... 235/472 |
| 5,576,531 | 11/1996 | Murphy ............................... 235/472 |
| 5,665,956 | 9/1997 | La et al. .............................. 235/472 |
| 5,672,860 | 9/1997 | Miller et al. ......................... 235/472 |
| 5,719,382 | 2/1998 | White .................................. 235/375 |
| 5,763,865 | * 6/1998 | Swift et al. .......................... 235/472 |
| 5,811,786 | 9/1998 | Rockstein et al. ................... 235/472 |
| 5,825,009 | 10/1998 | Schmid et al. ....................... 235/462 |
| 5,914,481 | * 6/1999 | Danielson et al. ................... 235/472 |
| 6,129,270 | * 10/2000 | Piazza ................................. 235/379 |

OTHER PUBLICATIONS

G81–3100 keyboard, Shortform Keyboard Catalogue, Cherry, Jul. 1997.*
Pocket PCs, Popular Mechanics. pp. 53,54, Jul. 1997.*
Logic Controls, Inc., Product Catalogue (1999).
Scansource, "POS and Barcoding Made Easy" 20–22, 118–126, 188–189 (Fall 1998).

* cited by examiner

Primary Examiner—John S. Hilten
Assistant Examiner—Anthony H. Nguyen
(74) Attorney, Agent, or Firm—Hoffman & Baron, LLP

(57) ABSTRACT

An integrated keyboard input device is disclosed, including those used for Point-Of-Sale system (POS). The standard keyboard is integrated with one or more optical scanners and any combination of other input peripheral devices, the optical scanner being mounted within the keyboard housing. The peripherals preferably can be selectively connected and disconnected from the keyboard and are interfaced with a keyboard wedge which allows each input peripheral to communicate directly to a computer in keyboard data format without requiring separate electrical connections to the computer.

10 Claims, 30 Drawing Sheets

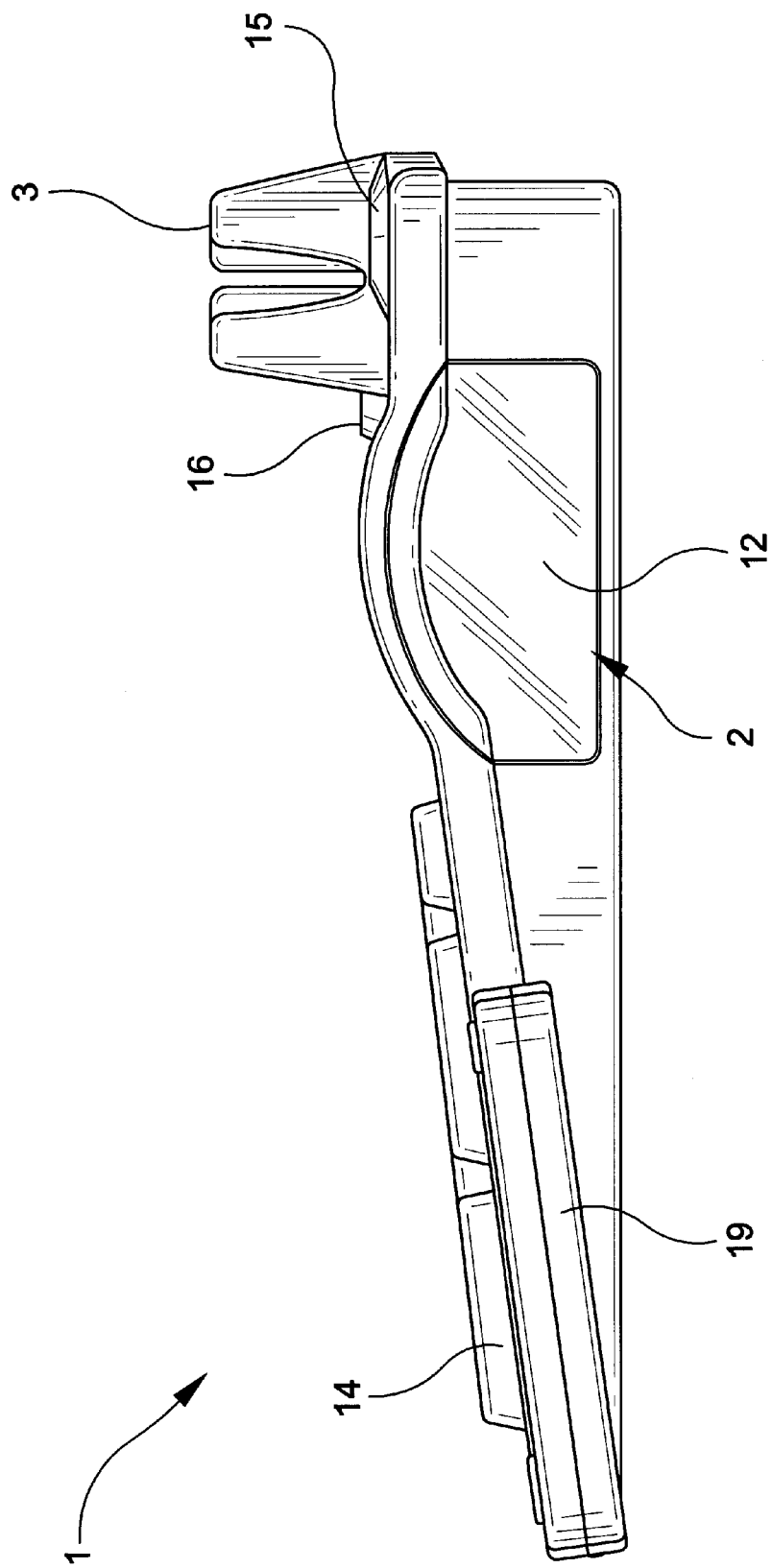

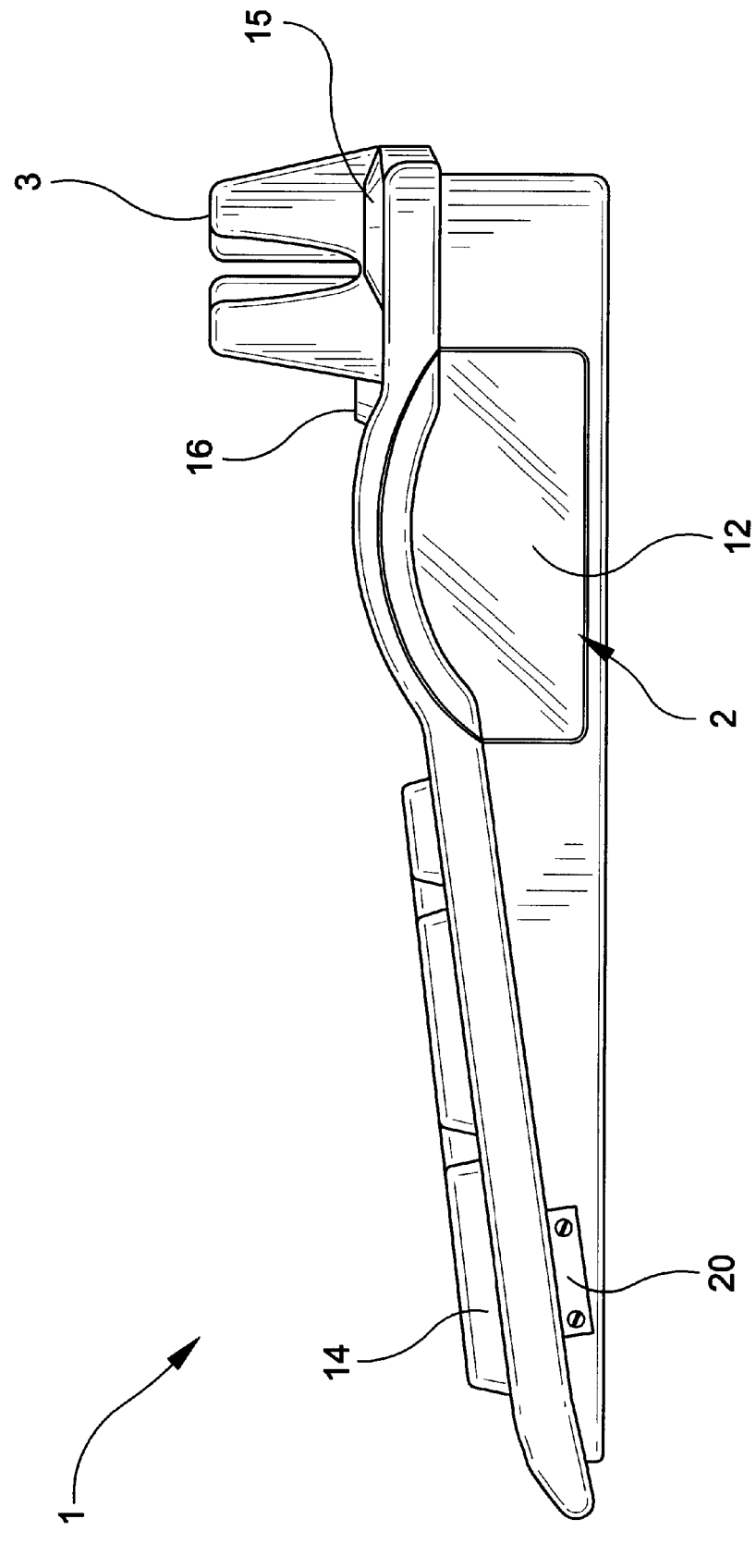

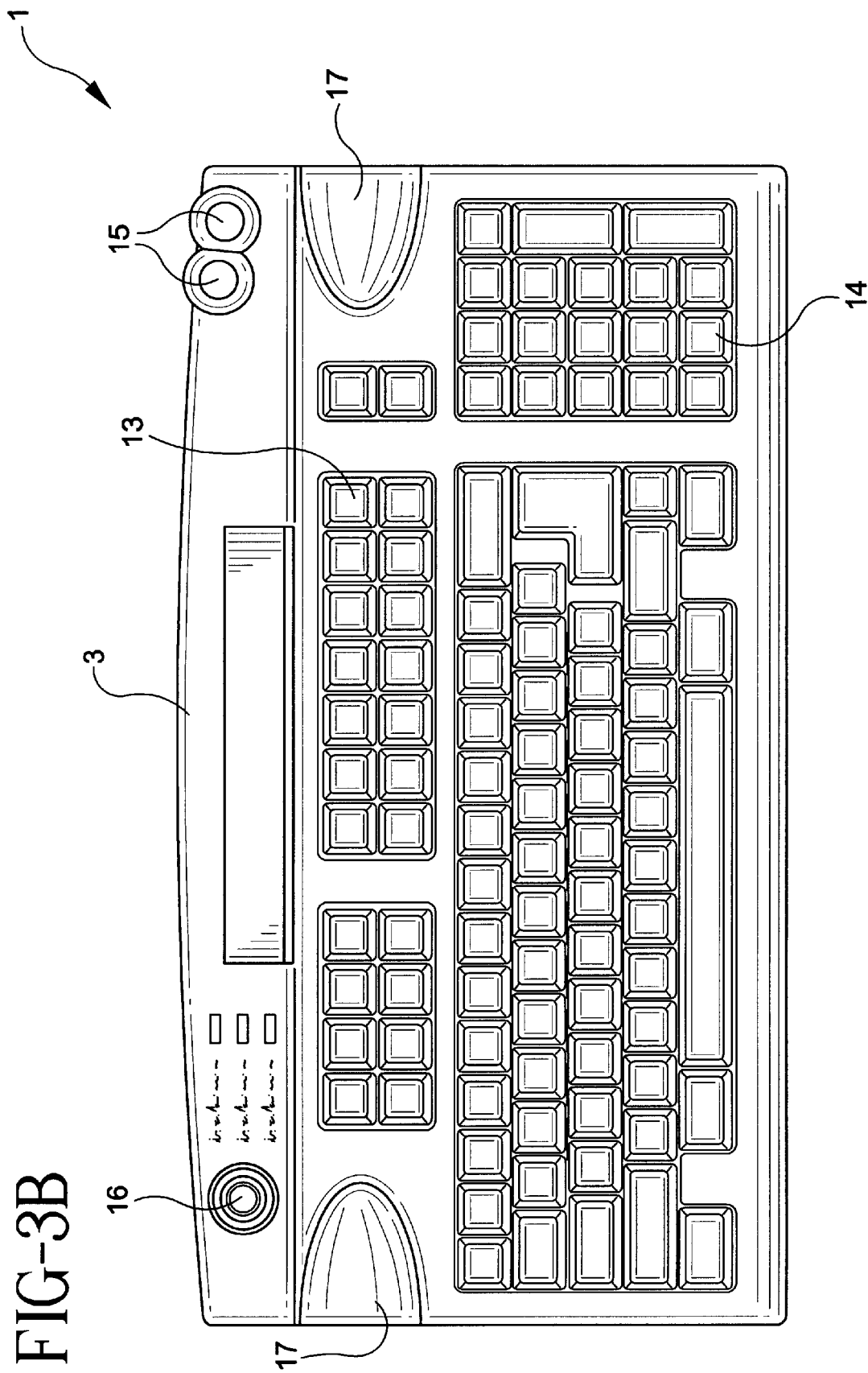

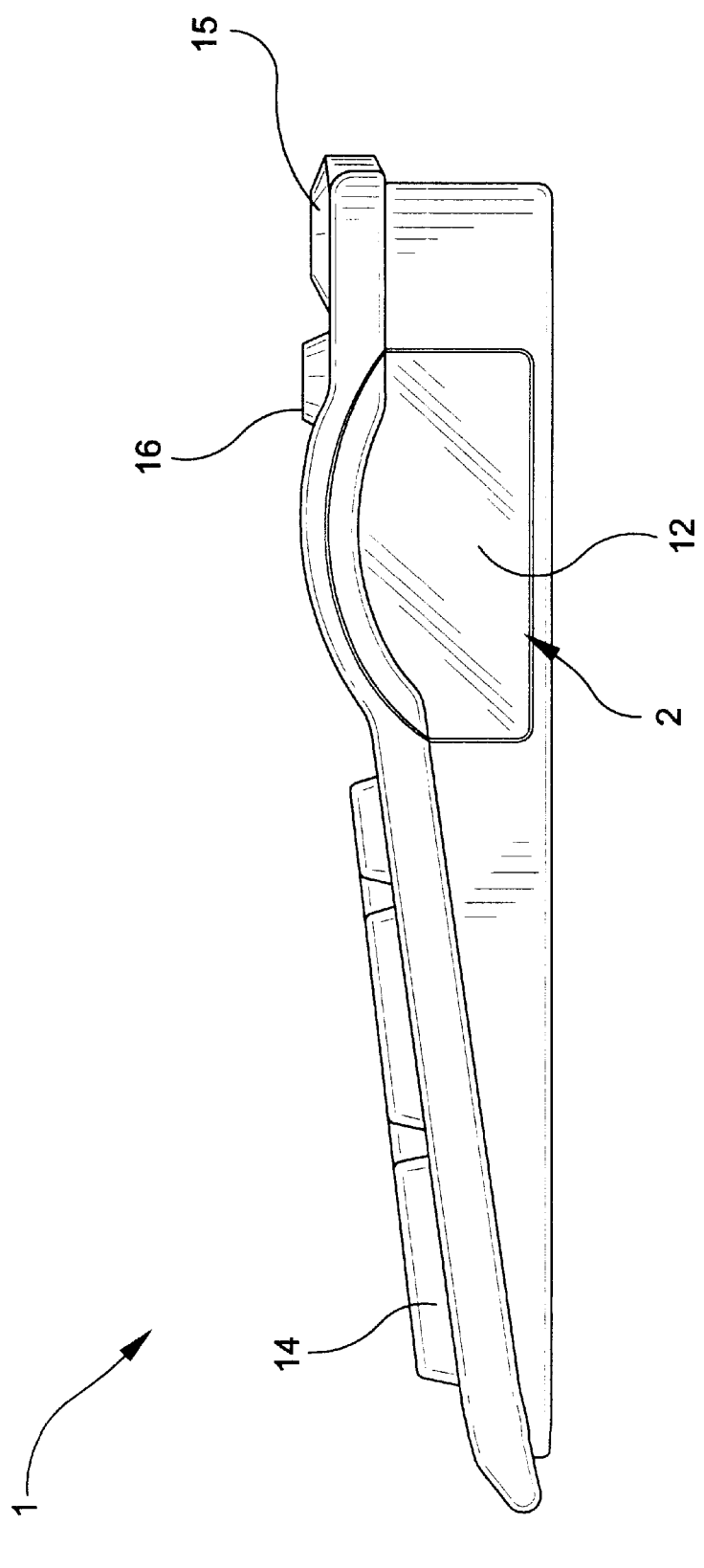

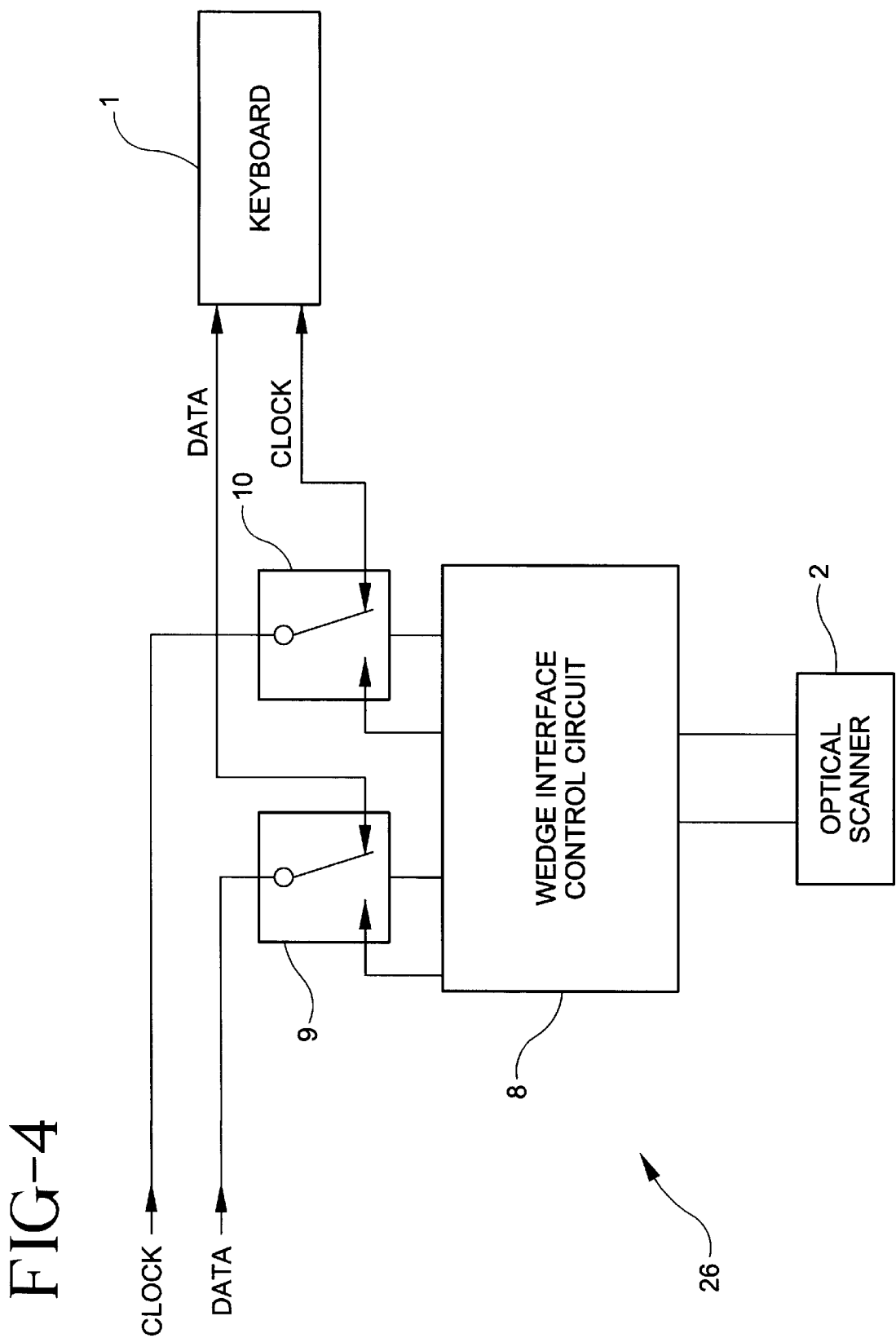

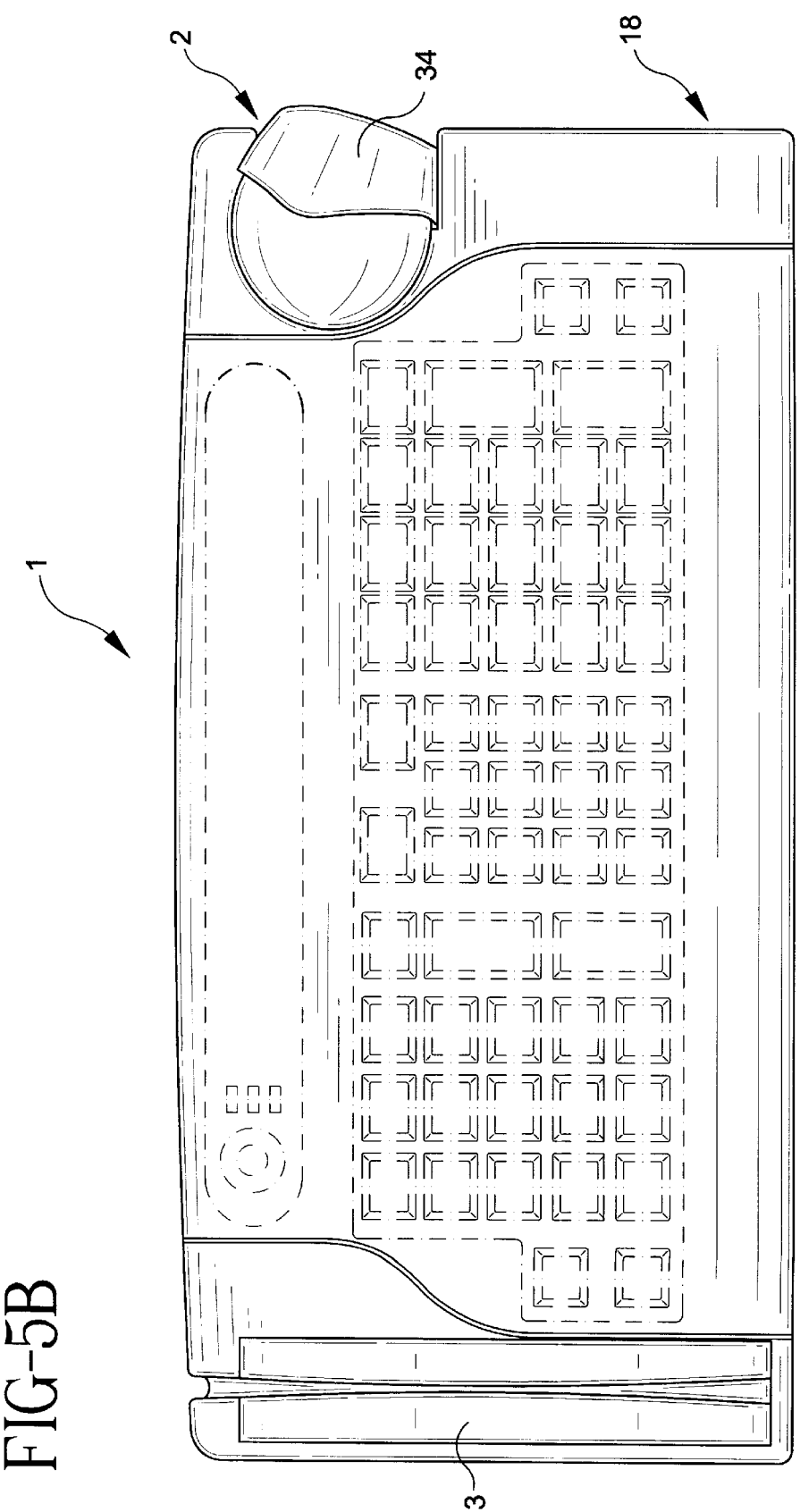

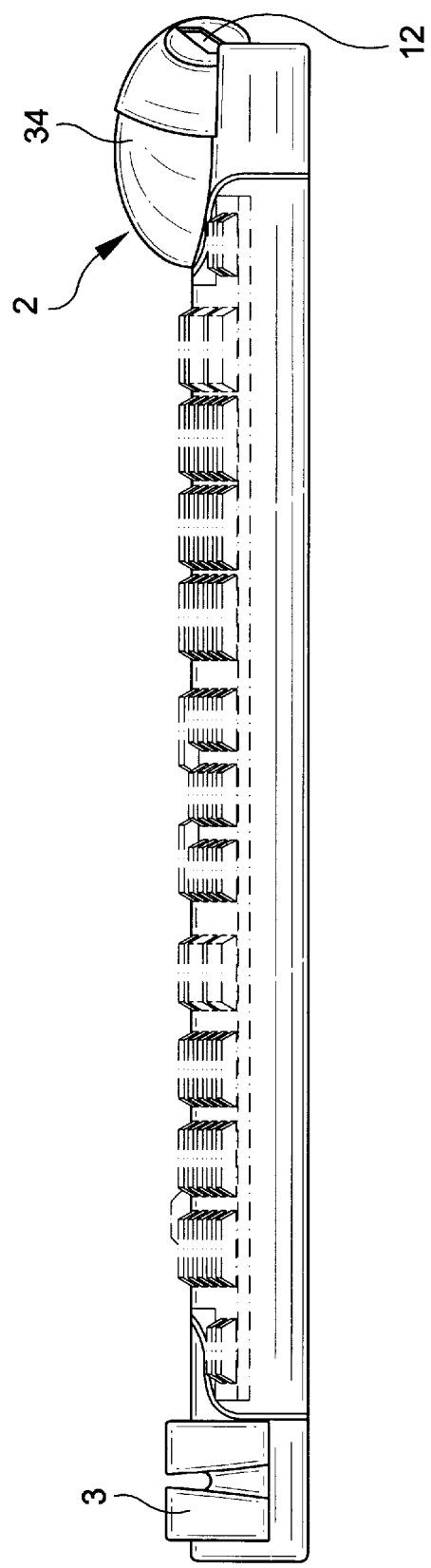

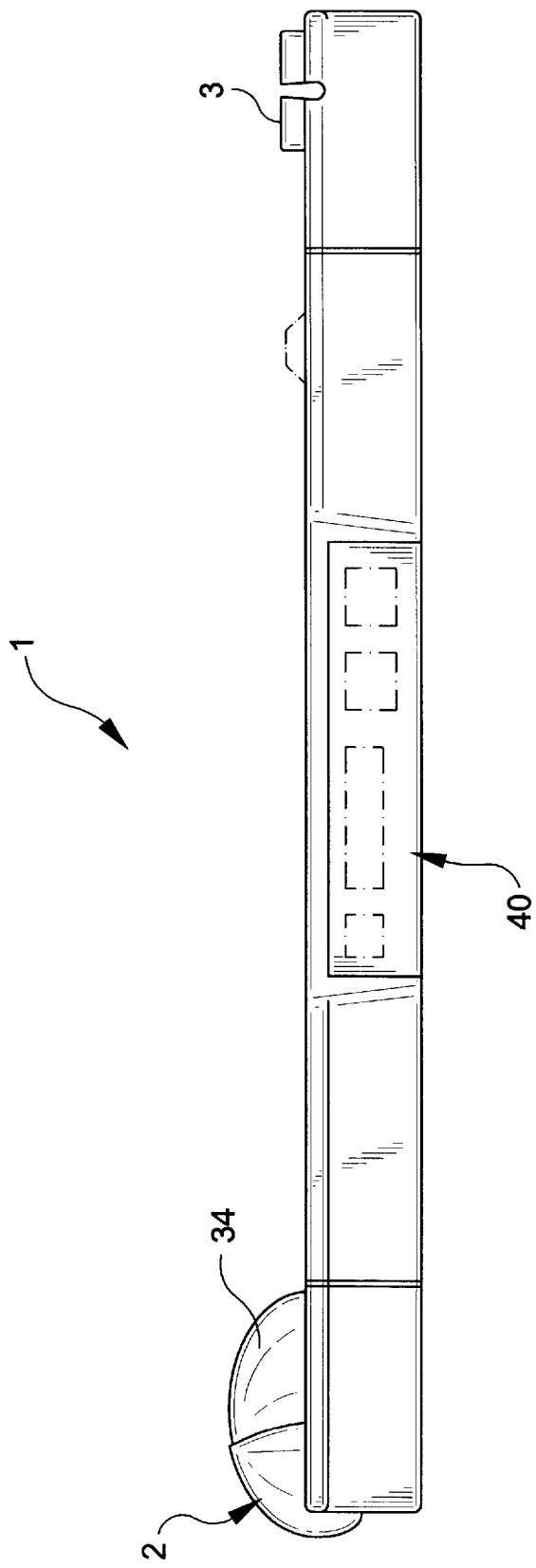

INTEGRATED KEYBOARD INPUT DEVICE

This application claims benefit to U.S. provisional Nos. 60/105,157 filed Oct. 21, 1998; 60/080,084 filed Mar. 31, 1998; 60/083,844 filed May 1, 1998; 60/087,457 filed Jun. 1, 1998.

BACKGROUND OF THE INVENTION

1. Field of the Invention

The present invention relates generally to an integrated keyboard device, including those used for Point-of-Sale (POS) systems, and more particularly relates to an integrated keyboard input device wherein a combination of input peripheral devices, such as an optical scanner, are combined with a keyboard to form a single integrated unit.

2. Description of the Prior Art

Point-Of-Sales (POS) systems are well-known in the prior art. Generally, in a Point-of-Sale system, a plurality of peripherals, such as, credit card readers, optical scanners, keyboards, smart card readers and the like need to interface with one another and with a local computer terminal. In the past, Point-of-Sale systems consisted of a "closed" system in which each peripheral needed to be separately connected to a central computer, each individual peripheral separately communicating to the computer in unique data formats and each requiring an individual interface to the computer. With the large variety of POS input devices available it has become difficult to integrate all the required devices. For example, the most commonly used POS components in a POS system include:

Cash drawer—interface with receipt printer, parallel port, or serial port,

Receipt printer—interface with parallel port or serial port,

Monitor and computer—interface with VGA port,

Customer pole display—interface with parallel port or serial port, keyboard—interface with keyboard or serial port, Credit card reader—interface with keyboard, parallel or serial port, Optical scanner—interface with keyboard or serial port.

Mouse pad or similar pointing device—interface with serial port.

Smart Card Reader—interface with parallel or serial port.

Interfacing multiple peripheral devices also requires a confusing maze of external cable connections to facilitate the interface. Each point of interconnection in a conventional POS system adds cost and complexity to the system while diminishing system reliability. A further impediment to component integration is the incompatibility of the physical sizes of various components. For example, it has been an impractical task to integrate an optical scanning engine into a standard keyboard housing. Furthermore, physical space limitations become increasingly apparent with each component added to a system.

POS input peripherals may be connected to a computer keyboard input port of a standard personal computer in a daisy chain configuration. A suitable system is described in U.S. application Ser. No. 08/899,290, incorporated by reference herein, a copy of which is also attached as appendix A.

Various keyboard devices are used as POS input devices, including traditional QWERTY configured keyboards, and programmable POS configured keyboards.

A number of prior devices provide a POS configured keyboard with an integrated magnetic stripe reader or smart card reader (for example, Cherry Electrical Products Model G81-7000). At least one prior art device (example Cherry Electrical Products Model G80-1950) further provides a laser bar code reader which is available as a plug-in attachment to a POS configured keyboard. These devices however are limited in that they are unable to support an optical scanner integrated within the keyboard and therefore require additional equipment space at the POS station as well as additional wiring and component costs.

Other prior art devices integrate a small hand-held data terminal, that has an integral programmable keypad, with a laser scanning head (for example, Symbol Technologies Portable Data Terminal, Model No. PDT3100. Such devices however are limited in that they do not offer the flexibility, capability or ergonomic ease of use of a standard sized keyboard. Nor are they capable of simultaneously integrating a plurality of POS input devices such as a credit card scanner, smart card reader, touch pad, etc.

At least one prior art device, including, for example, U.S. Pat. No. 5,113,060, to Wilke, Jr. et al., houses an optical scanner within a data terminal, the data terminal including various externally mounted POS input devices such as a POS keyboard, receipt printer and cash drawer. However the data terminal housing itself is a large enclosure on which a keyboard is attached. None of these devices integrate an optical scanner within the housing of a standard keyboard.

U.S. Pat. No. 5,811,786 to Rockstein et al. discloses a wireless bar code reading device that includes a portable scanner unit and an associated base unit. The base unit is inserted into a keyboard device. The portable scanner unit, which is hand held and separate from the keyboard, scans a target object and transmits data to the associated receiving base unit which transmits the data directly to the computer. The receiver base unit is not an optical scanner but rather a plug-in type signal transceiver that communicates with an external laser scanning engine. This device does not integrate an optical scanning engine within a standard sized keyboard housing.

As discussed above, prior to the present invention it has been impractical to integrate a number of the above-referenced POS components as part of a POS keyboard, with at least one of the components being an optical scanner, housed within the keyboard.

It would be desirable to minimize both the number of interconnecting cables and the number of individual POS input devices needed by integrating components with compatible data format, thus introducing physical space savings, lower costs, improved performance, enhanced reliability, and to achieve more harmonious styling.

It is also desirable to provide a keyboard input device wherein a plurality of the above referenced POS components, including an optical scanner, are integrated in the housing of a standard POS or QWERTY configured keyboard device.

SUMMARY OF THE INVENTION

These and other advantages and gols are realized by the present invention in which provides an integrated keyboard input device, including those used for Point-Of-Sale systems (POS). A standard keyboard is integrated with one or more optical scanners and any combination of other input peripheral devices. The keyboard comprises a housing adapted for holding keyboard keys and circuitry therefore, said keyboard circuitry and said scanner module having an output for connection to a computer. The optical scanner is mounted within the keyboard housing which has substantially the same external dimensions as a standard QWERTY or POS computer keyboard.

The peripherals preferably can be selectively connected and disconnected from the keyboard and are interfaced with a keyboard wedge, which allows each input peripheral to communicate directly to a computer in keyboard data format without requiring separate electrical connections to the computer. The keyboard and optical scanner interface to said computer through a wedge circuit thereby avoiding bus contention. The optical scanner module may include CCD scanners, OCR scanners, LED wand scanners or laser scanners. The laser scanners may include a linear one dimensional laser scanner, 2 dimensional rastering laser scanner or an omni directional laser scanner. The scanner engine may include a pivotable mounting which allows the optical scanner to be rotated in at least one of three directions or a gimbal to provide for the positioning of the scanner in both the horizontal axis and the vertical axis. Additionally, the scanner may include a mounting cup into which a ball housing holding said optical scanner is seated, said mounting cup including a pivotable mounting to provide for the positioning of the scanner in both the horizontal axis and the vertical axis.

The keyboard may also include a magnetic card reader wherein said magnetic card reader interfaces to said computer through a wedge circuit thereby avoiding bus contention and whereby said magnetic card reader has an output for connection to a computer. Alternatively, the keyboard may include a smart card reader, wherein said smart cart reader interfaces to said computer through a wedge circuit thereby avoiding bus contention, and whereby said smart card reader has an output for connection to a computer.

The keyboard may further comprise a touch pad, wherein said touch pad interfaces to said computer through a wedge circuit thereby avoiding bus contention and whereby said touch pad has an output for connection to a computer.

DESCRIPTION OF THE DRAWINGS AND APPENDICES

FIGS. 1a, 1b, 1c and 1d, are perspective, top plan, side elevational and top plan cut-away views, respectively, of an integrated keyboard device in a preferred QWERTY configuration including, an optical scanner, a magnetic card reader, and a touch pad formed in accordance with the present invention. FIG. 1d. is a top plan cut-away view of the housing bottom of the keyboard enclosure, illustrating the laser scanner engine mountings on the left and right sides of the keyboard with the scanner engines, card reader, circuitry, keyboards and upper housing removed.

FIGS. 2a, 2b and 2c are views similar to FIGS. 1a, 1b and 1c except the device is shown without the touch pad installed.

FIGS. 3a, 3b and 3c are similar to FIGS. 1a, 1b and 1c except the device is shown without the touch pad, magnetic card reader, or the optical scanner installed.

FIG. 4 is a block diagram illustrating a simplified electrical interface between a keyboard and an optical scanner module (or magnetic card reader, or smart card reader or touch pad), in accordance with the present invention.

FIGS. 5a–5f are perspective, top plan, left side, right side, front elevational and, rear elevational views respectively, of an integrated keyboard device including an alternative POS keyboard configuration integrated with an optical-scanner and a magnetic card reader, formed in accordance with the present invention.

Appendix A is a detailed description of a daisy chain network configuration suitable for interfacing multiple input devices in an integrated keyboard device, formed in accordance with the present invention.

DETAILED DESCRIPTION OF THE PREFERRED EMBODIMENTS

Figure 1A:
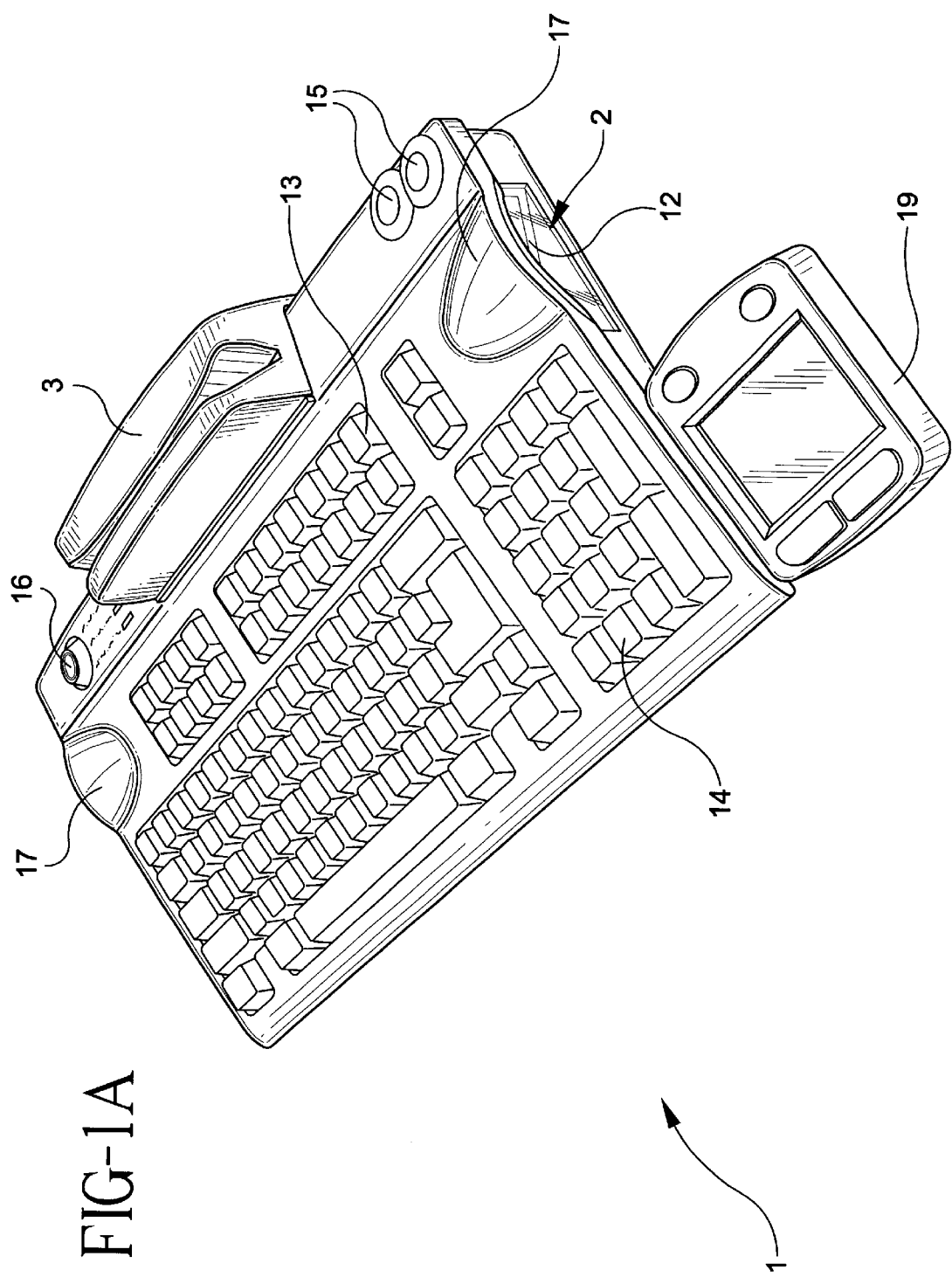

FIG. 1a illustrates an integrated keyboard input device formed in accordance with the present invention. Among the components of a Point-of-Sale (POS) system, the keyboard 1, credit card reader 3, touch pad 19, smart card reader (not shown) and optical scanner 2 can be configured in a daisy chain method, as described in U.S. application Ser. No. 08/899,290, incorporated by reference herein and a copy of which is also attached as Appendix A, to output the same data format in PC scan code. Accordingly, any combination of these components can be advantageously integrated with the keyboard, the combination preferably including an optical scanner.

Recently, new optical scanner technology made it possible to build an optical scanning engine in a very small physical unit. With such a miniature size, it becomes feasible and beneficial to integrate an optical scanner within a standard keyboard enclosure with QWERTY or POS key configurations. Furthermore, other devices such as a credit card reader 3, touch pad 19, or smart card reader, can be integrated with the same keyboard 1, in any combination with the optical scanner 2.

Clearly, the advantages of having the above-mentioned devices integrated include:

1. All the external interconnecting cables between these devices are eliminated.
2. Multiple small separate devices including an optical scanner module, are integrated in one compact enclosure.
3. Lower system cost because of fewer enclosures.
4. Guarantee of interface compatibility between peripheral components.

Figure 1B:
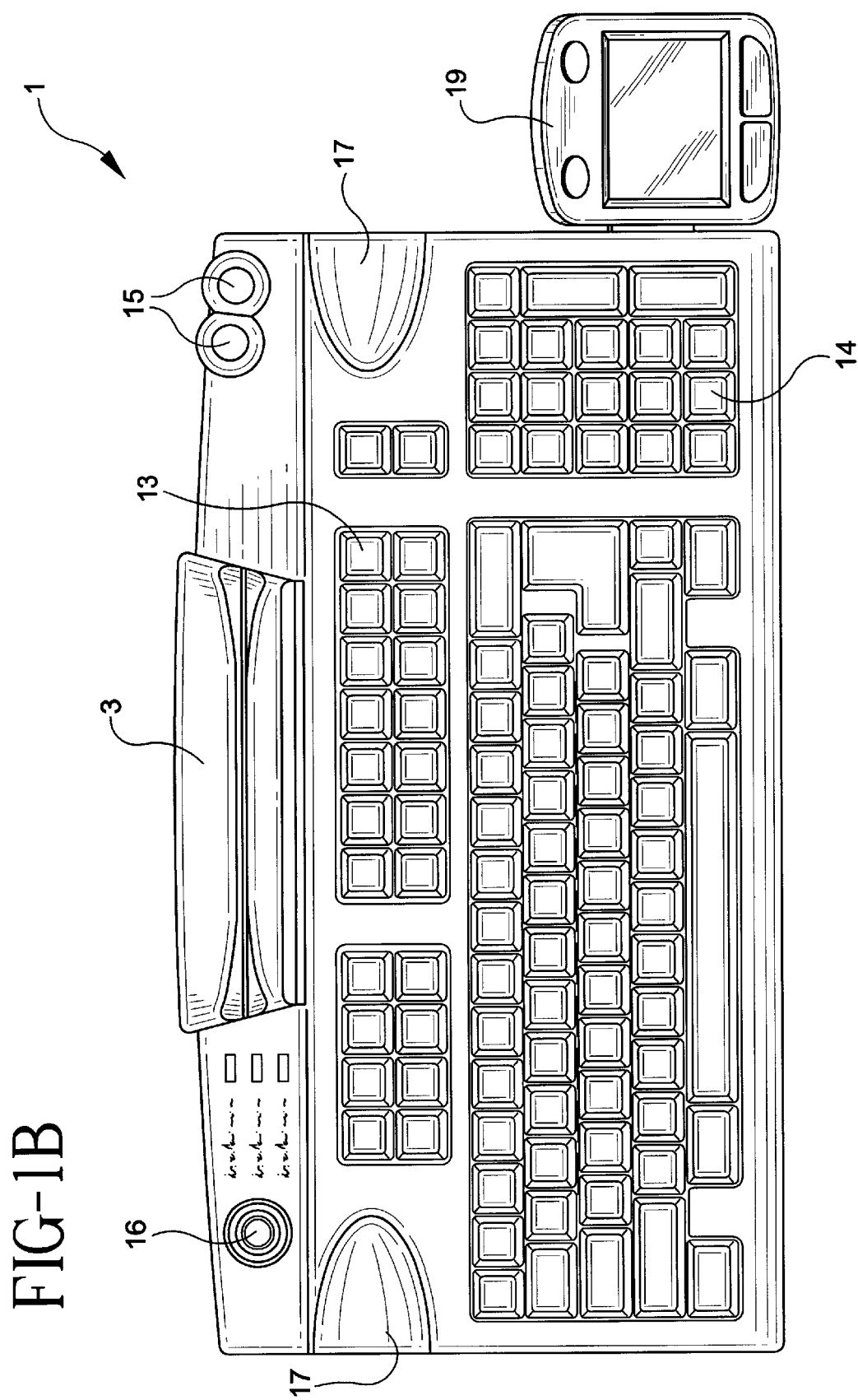
Figure 1D:
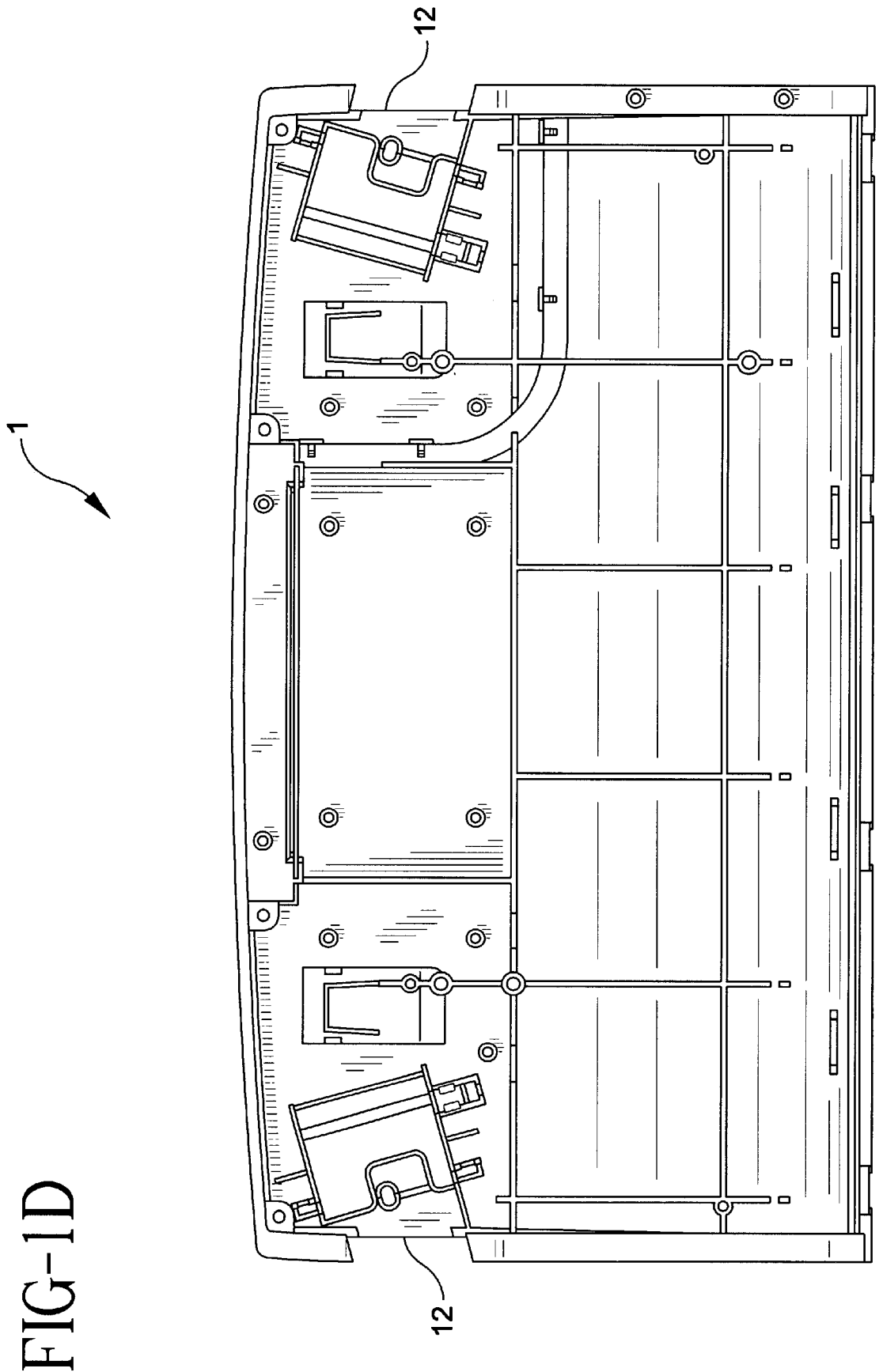

FIGS. 1a, 1b and 1c illustrate an integrated keyboard formed in accordance with one embodiment of the present invention. In this preferred embodiment, a QWERTY configured keyboard 1, such as KB 5100 or equivalent, manufactured by Logic Controls, Inc. of New Hyde Park, N.Y. (hereinafter the preferred integrated QWERTY keyboard is referred to as Logic Controls KLASER-1) is integrated with an optical scanner module 2. In this embodiment, each of the POS input peripherals, take the form of a modular device which may be readily disconnected and reconnected at its respective alternate mounting locations as described below.

Figure 5A:
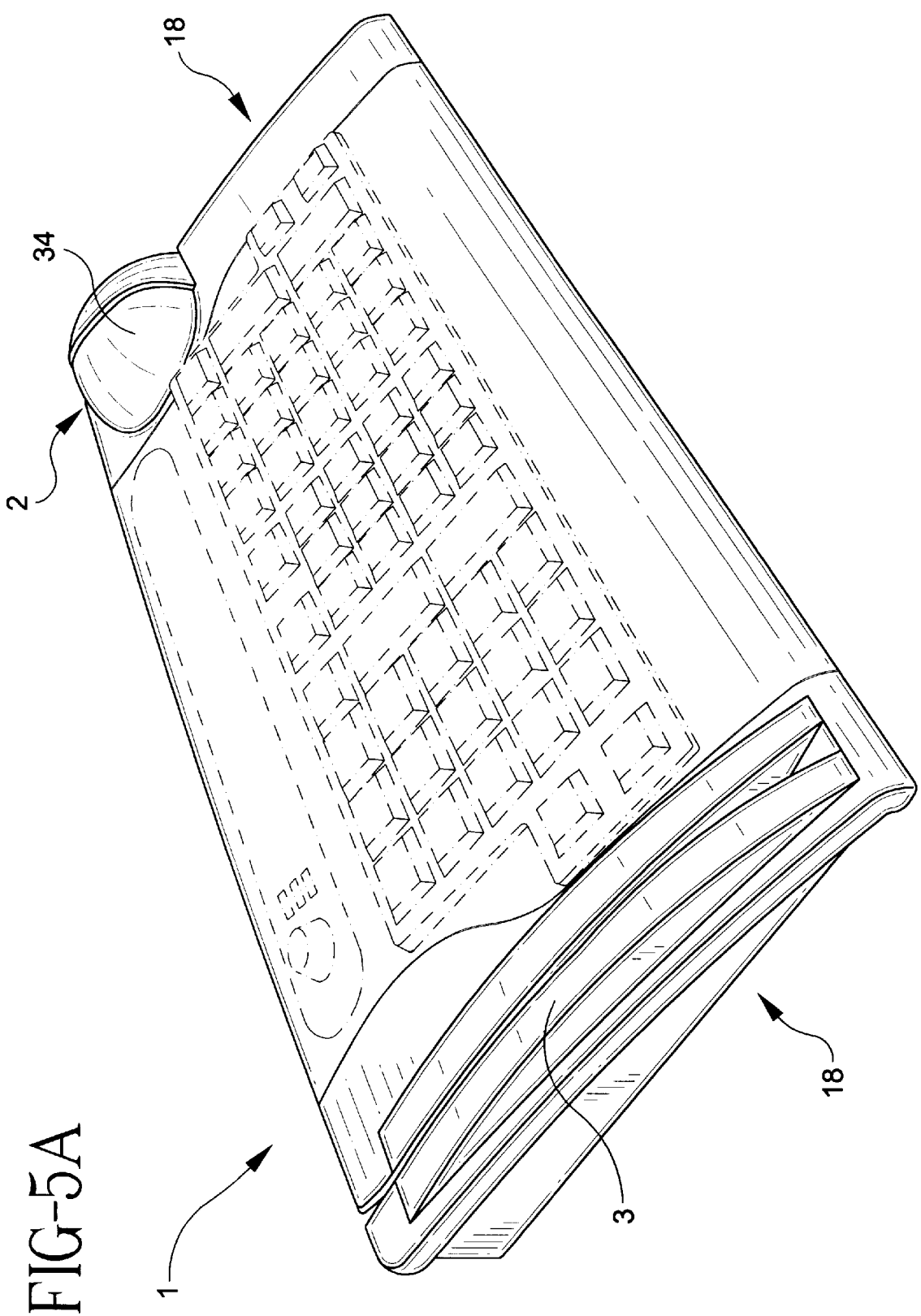
Figure 5C:
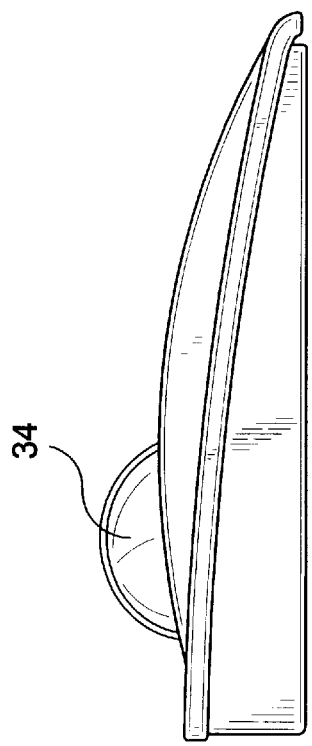
Figure 5D:
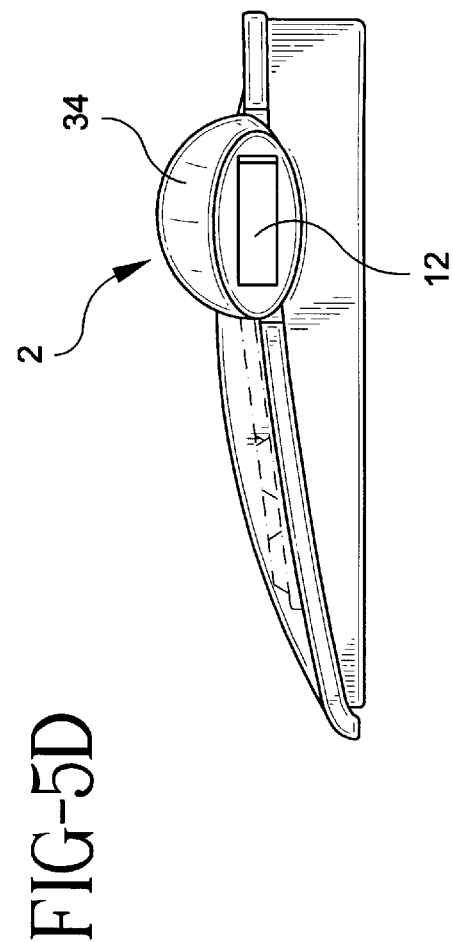
Figure 5G:
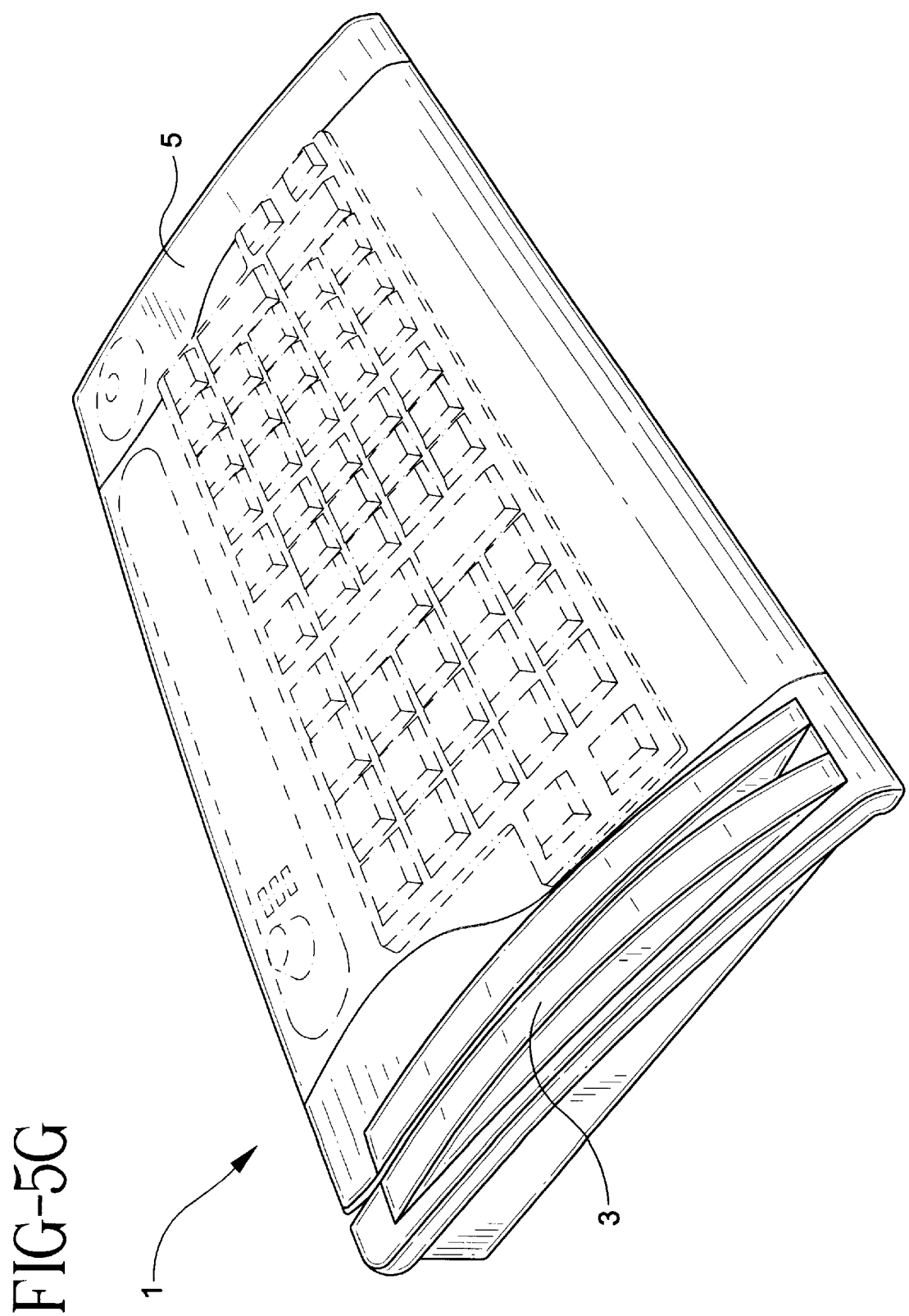
FIGS. 5g–5l are similar to FIGS. 5a–5f, respectively, except that the device is shown with the credit card reader installed on the left side of the device and a blank cover installed on the right side of the keyboard.
Figure 5H:
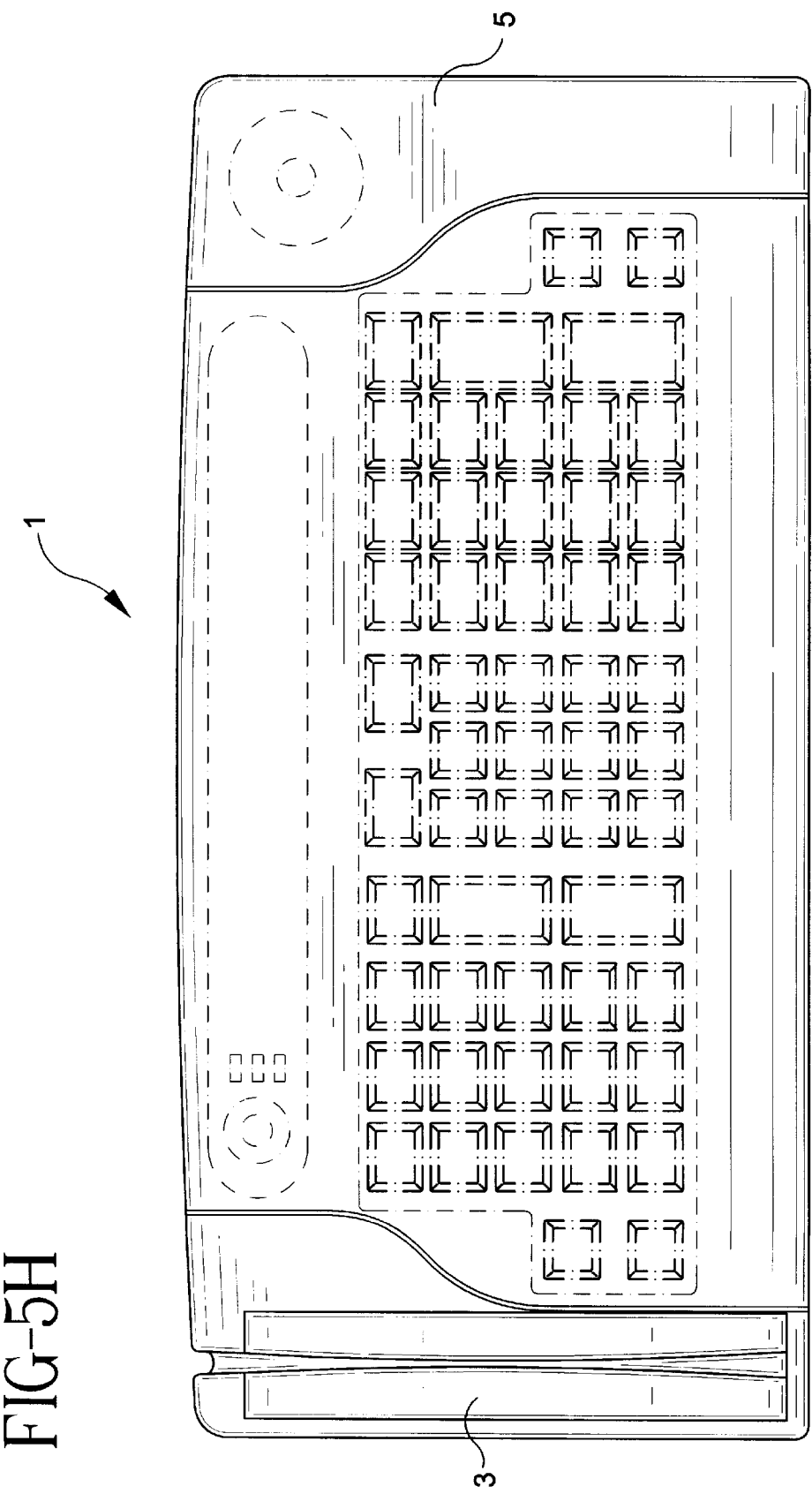
Figure 5J:
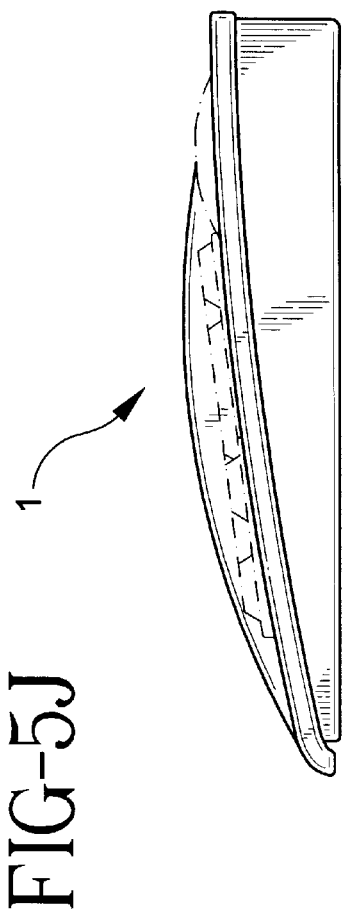
Figure 5I:
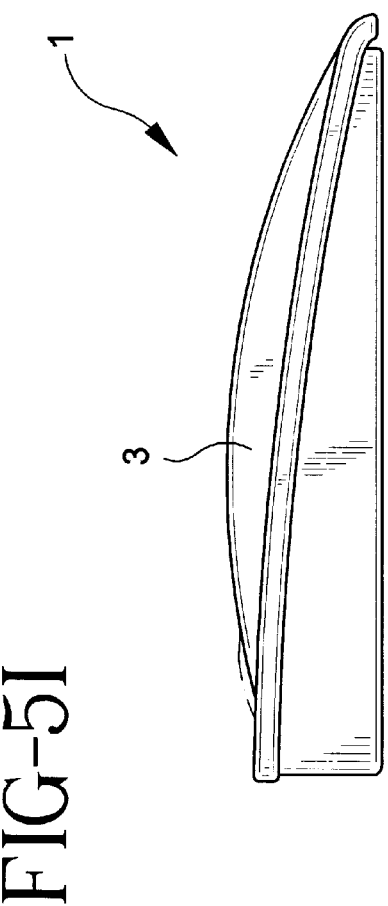
Figure 5K:
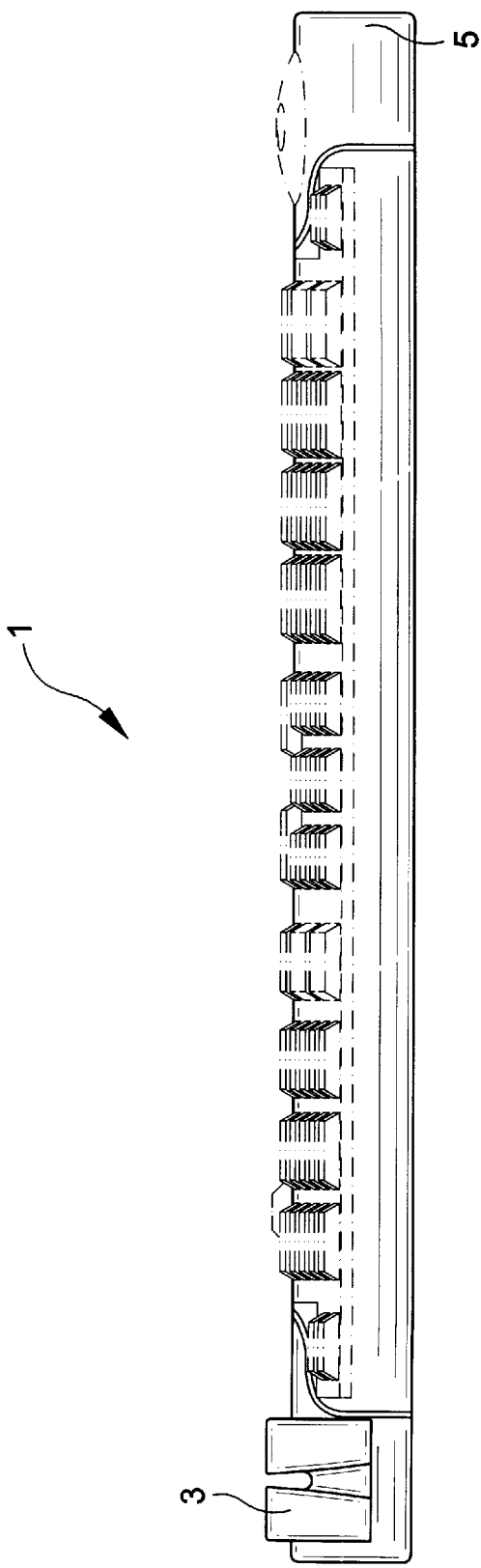
Figure 5L:
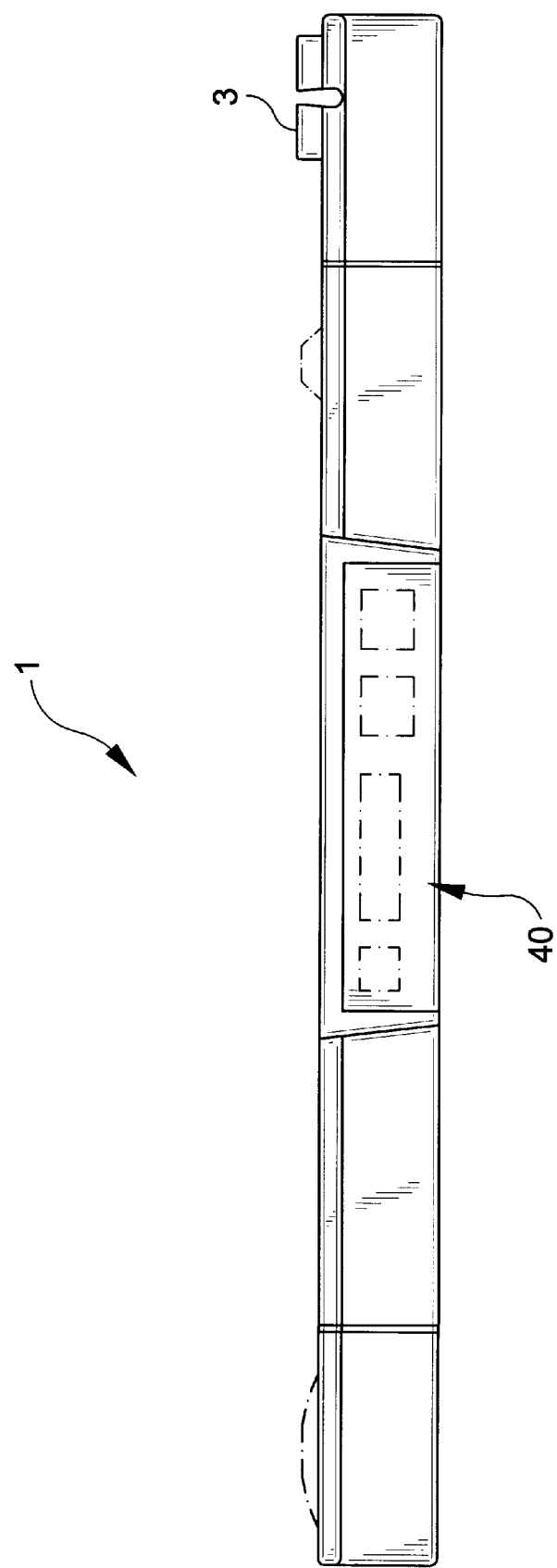
Figure 5M:
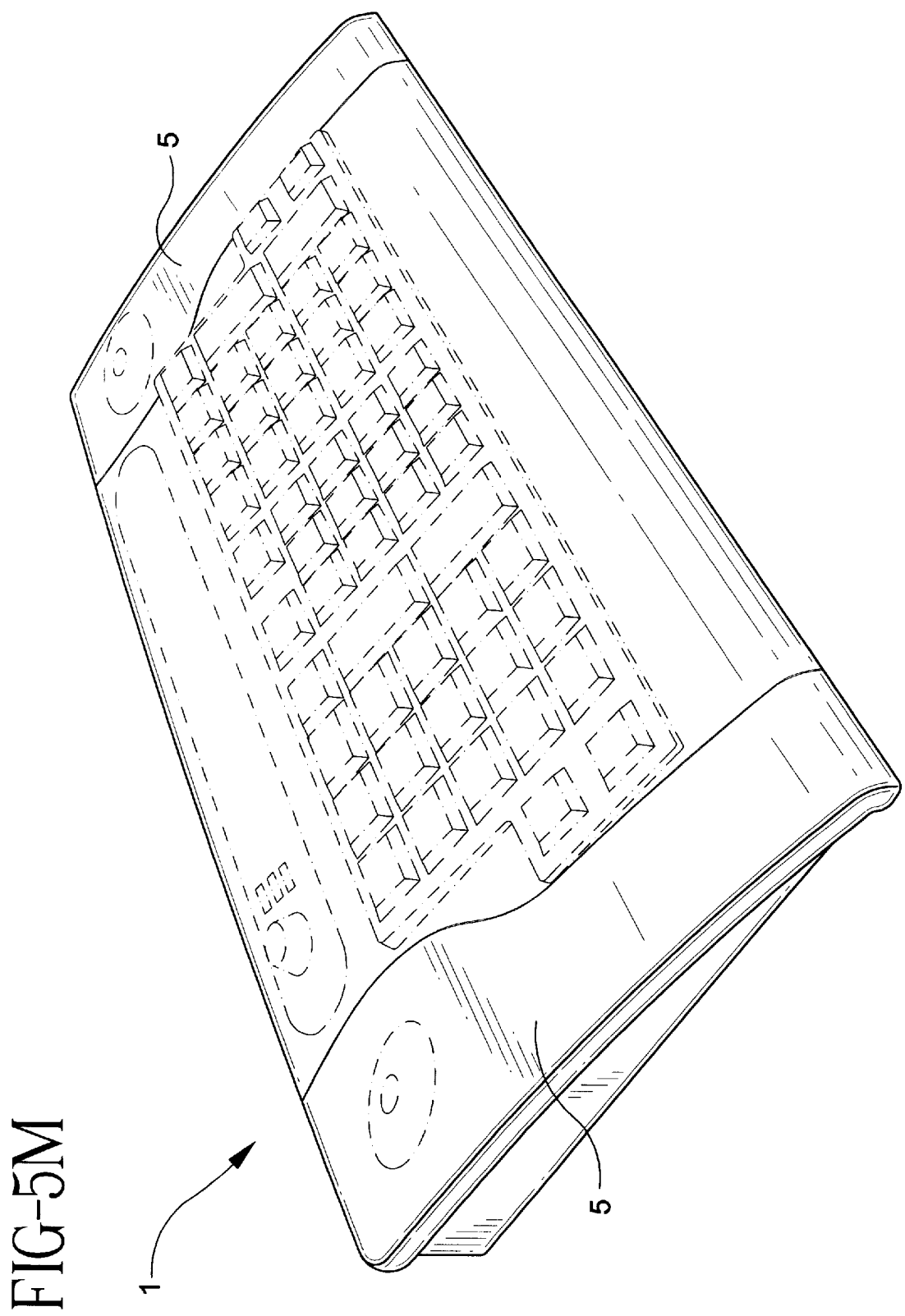
FIGS. 5m–5r are similar to FIGS. 5g–5l, respectively, except that the device is shown with blank covers installed at both the left and right sides of the keyboard.
Figure 5N:
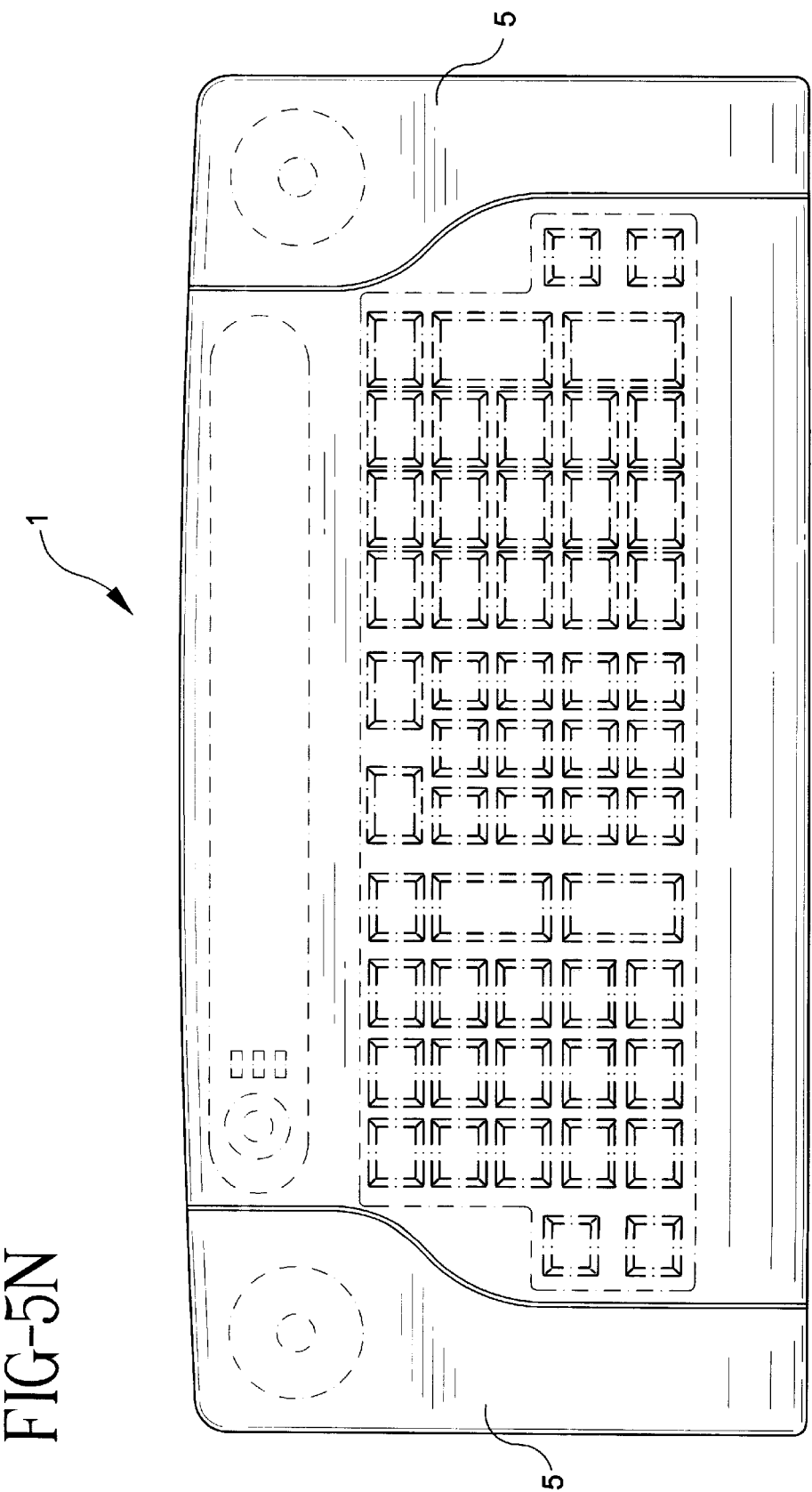
Figure 5O:
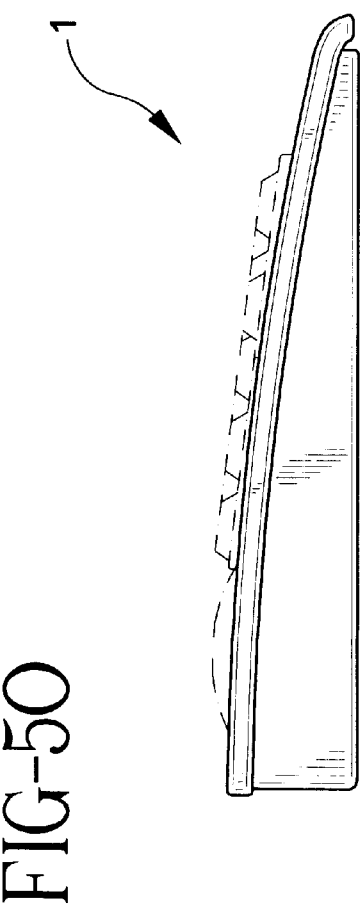
Figure 5P:
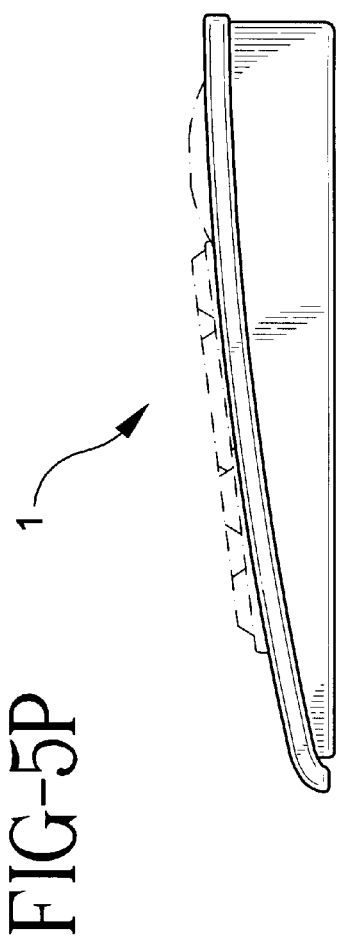
Figure 5Q:
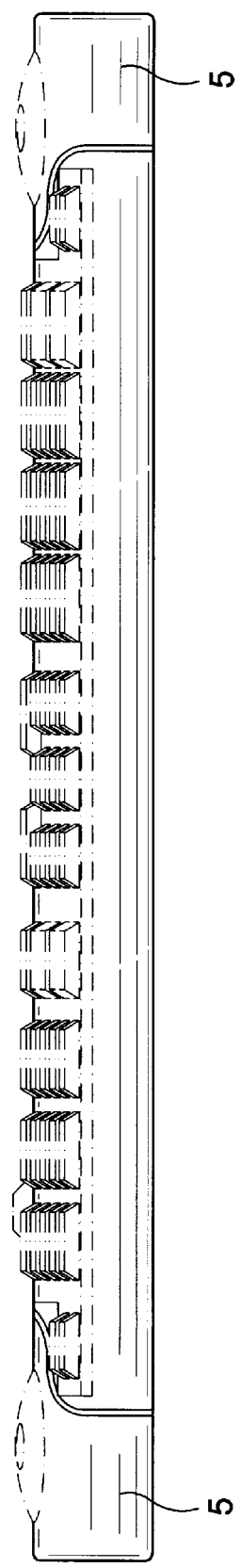
Figure 5R:
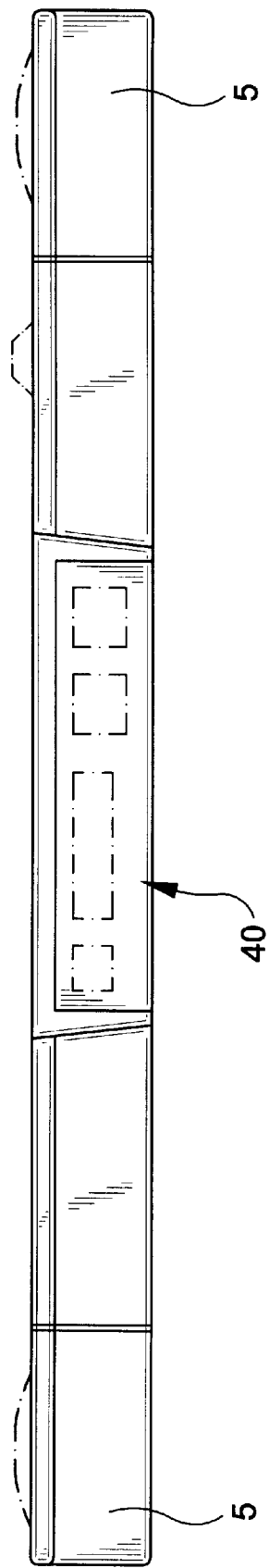
Figure 5S:
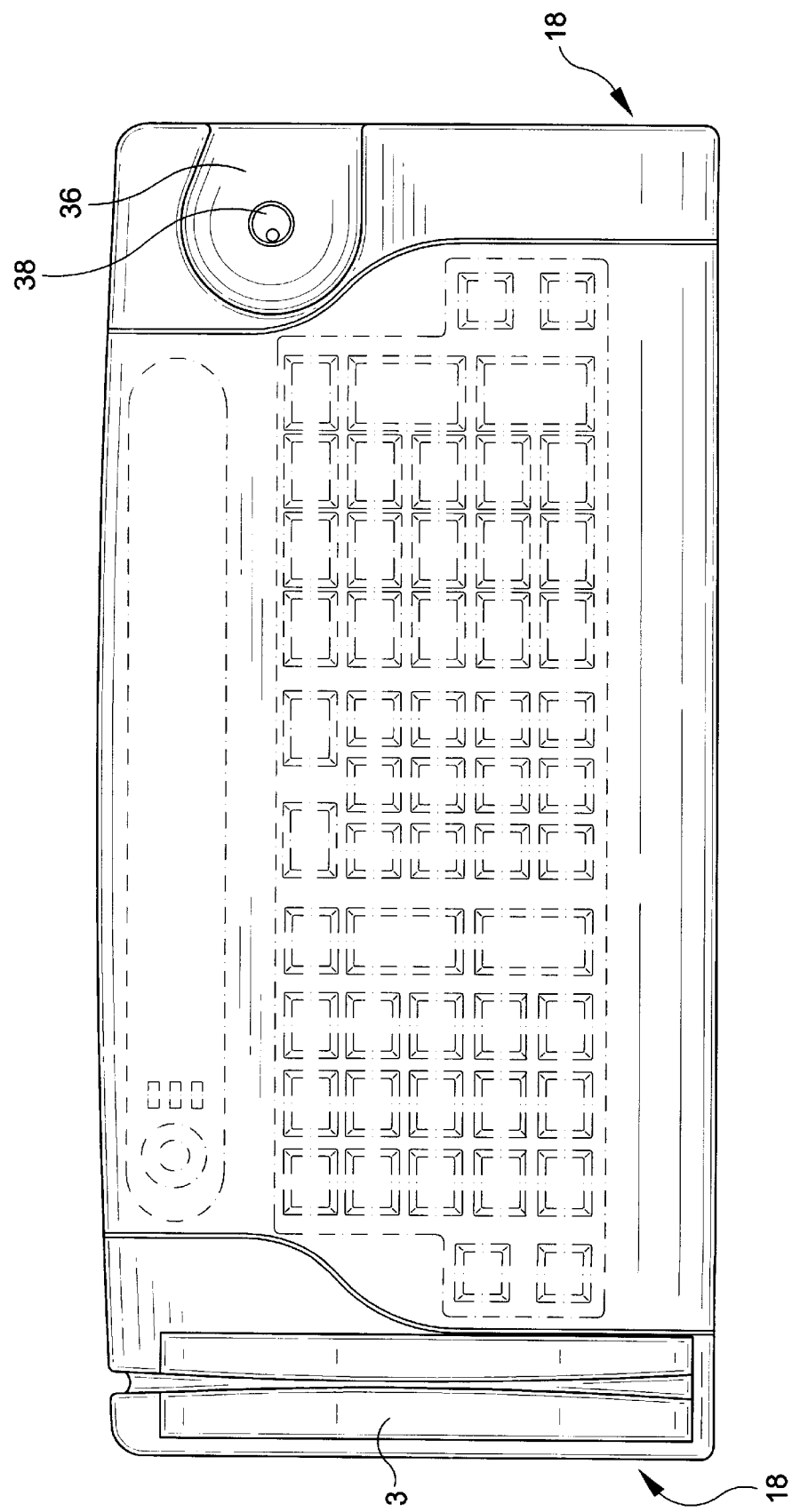
FIG. 5s is similar to FIG. 5b, with the optical scanner ball housing removed.

In an alternative embodiment, a POS keyboard such as the Logic Controls Klaser 11 model, or equivalent, is used, as illustrated in FIGS. 5a–5s. In this embodiment, each POS input peripheral preferably takes the form of a modular device which may be readily interchanged with any other POS input device in mounting locations 18 on either the left or right sides of the keyboard 1 as shown in FIGS. 5a–5s.

Figure 2A:
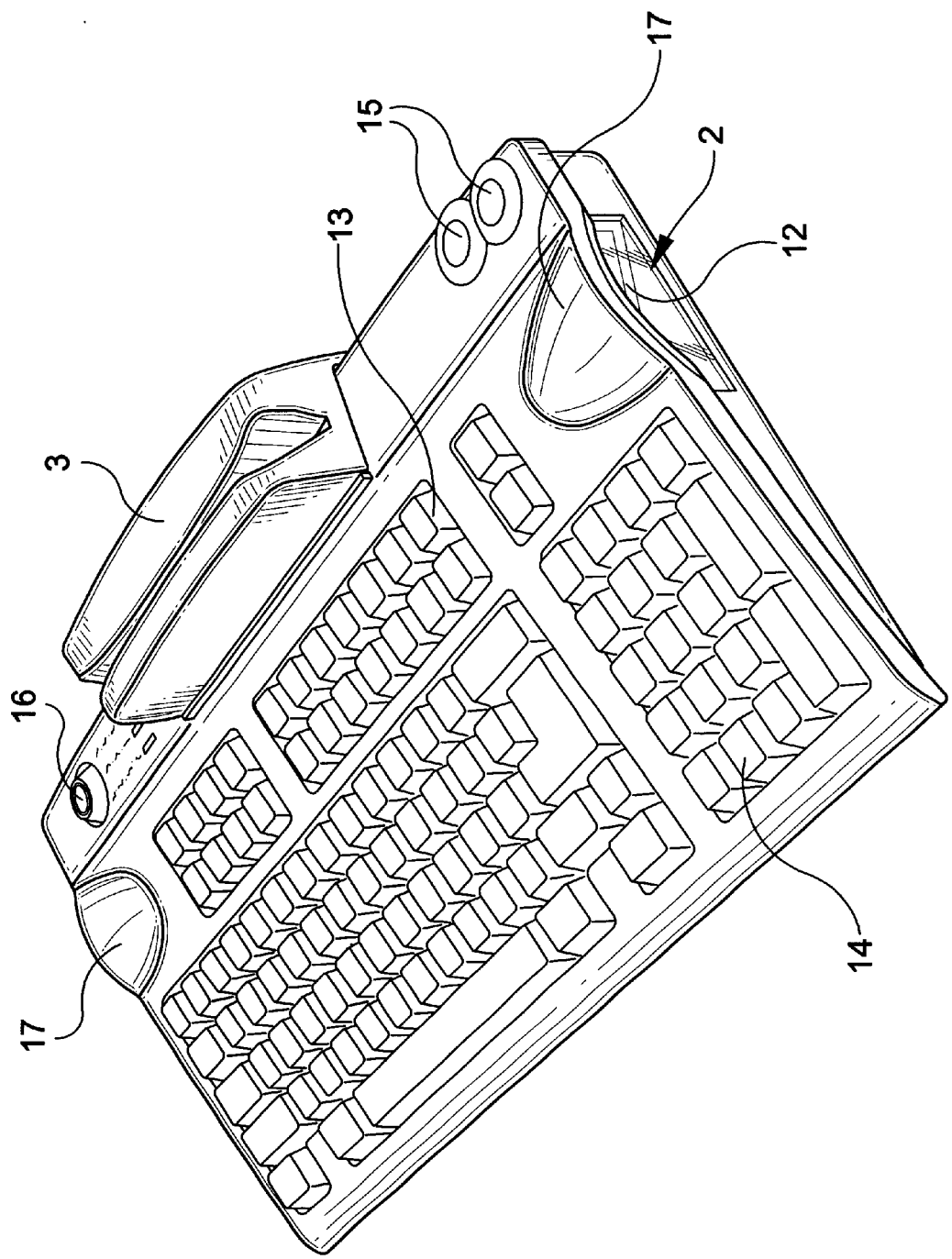
Figure 2B:
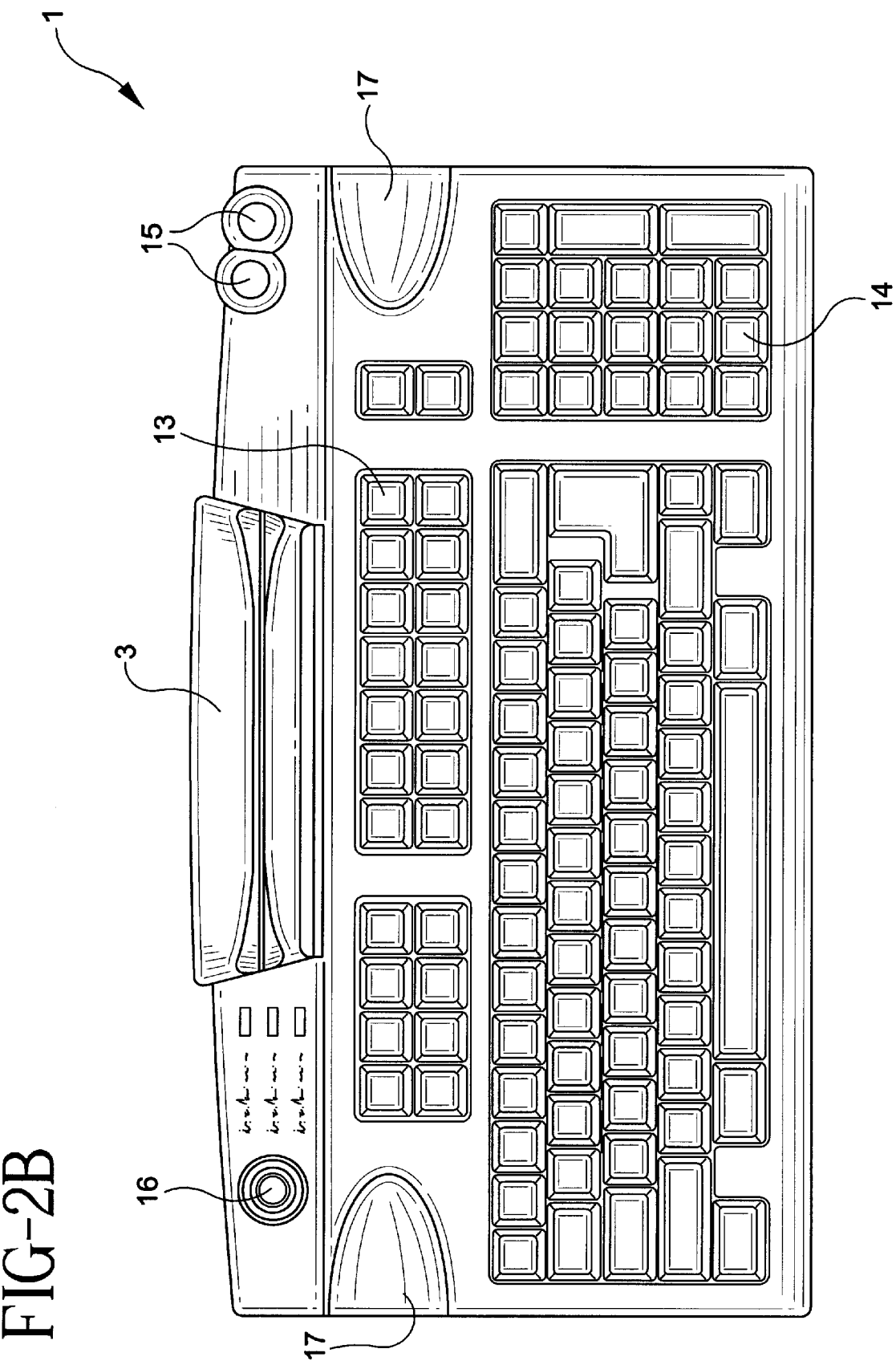

While the optical scanner 2 of the preferred embodiment is preferably implemented as a laser scanner (not shown), it is contemplated that the optical scanner 2 may comprise other types of scanning engines, for example, LED wand scanners, Charged Couple Device (CCD) scanners or Optical Character Recognition (OCR) scanners. Also, while the laser scanner of the preferred embodiment preferably comprises a linear, one dimensional laser bar code scanner, it is contemplated that the laser scanner may comprise other types of laser scanning engines, including as, a) a one dimensional linear laser scanner, (b) a two dimensional rastering laser scanner, or c) an omni directional laser scanner. A suitable example of a modular laser scanning engine (not shown), for example is scanning engine series SE1200, manufactured by Symbol Technologies, Inc. of Bohemia, N.Y. or equivalent, (preferably Model No. SE1223, which includes a decoder, hereinafter referred to as Symbol Technologies SE1223), mounted within keyboard 1, and enclosed behind a plastic optical lens 12, such as CR39 material utilized by Symbol Technologies or other suitable lens. Other suitable scanners are commercially available from Symbol Technologies as well as from other manufacturers. The lens 12, illustrated in FIG. 2c, preferably has anti-reflective properties, a hardened surface to resist scratching and good transmissibility at about 650 nm, the wavelength of the laser scanner. Furthermore the lens preferably has a large enough cross sectional area to accommodate one dimensional linear scanning, two dimensional raster scanning as well as omni directional scanning.

The optical scanner 2 is advantageously configured to fit into either or both of the raised scanner engine areas 17 of the Logic Controls KLASER-1, which are formed from areas raised in a stylized fashion to accommodate the scanner engine and are preferably located at the right and left most ends of the keyboard 1 as shown in FIGS. 1a–3c. In an alternative embodiment, optical scanner 2 may be mounted to keyboard 1 at one or more alternative mounting locations (not shown) including, for example, the top face of the keyboard 1 in place of credit card reader 3; the top edge of the keyboard 1 facing away from the user or the bottom edge of the keyboard facing the user.

In another embodiment, the Logic Controls Klaser-II model keyboard 1 is employed. The optical scanner 2 is preferably configured to fit within one or more of the modular mounting locations 18 on either the right or left sides of the keyboard 1. The optical scanner 2 includes a ball housing 34, in which the scanner engine (not shown) is enclosed. FIG. 5s illustrates the keyboard 1 with the ball housing 34 removed. Ball housing 34 is dimensioned to fit within mounting cup 36 which includes an aperture 38 at the bottom of said mounting cup 36, for wiring access to the scanner engine. The optical scanner 2, within the ball housing can be pivoted vertically or horizontally to optimize the location and direction of the scanner engine in relation to the keyboard 1. Alternatively, the ball housing may be pivotably mounted on vertically aligned or horizontally aligned pivot points or on a gimbal, as described below. When either of the mounting locations is unused a cover 5 is preferably installed as shown in FIGS. 5g–5r. Cover 5 includes tapered holes 15 which may be used as pen or pencil holders.

In an alternative embodiment, where a wand type scanner (not shown) is employed, the wand scanner is preferably mounted within the keyboard enclosure at mounting areas 18. However, the wand scanner may be removably attached to the exterior of the keyboard 1 with a mounting clip (not shown) or other conventional mounting means and remotely linked to the keyboard 1 via a coiled extension wire.

The simplest physical mounting interface between the optical scanner module 2 and keyboard 1, is in the form of a fixedly mounted, rigid interface. However, fixed mounting has the disadvantage of reduced ergonomic adaptability. Therefore, a preferred mechanical mounting of the optical scanning engine includes a pivotable mounting which allows the canning engine to be rotated in a number of directions. In one embodiment of the present invention, the optical scanning engine is pivotally mounted on two horizontally aligned points to allow the user to adjust the scanning beam angle by means of a scanning beam adjustment lever (not shown), to account for varied placement of the keyboard 1 or the object to be read. In an alternative embodiment of the present invention the optical scanning engine is similarly mounted on vertically aligned pivot points to allow the user to adjust the horizontal positioning of the scanning beam. In yet another embodiment of the present invention, the optical scanning engine is mounted on a gimbal to provide for the positioning of the scanning beam by a track ball or roller type device to control both the horizontal and vertical axis. These embodiments allow the POS integration of the present invention to be adapted to the most ergonomic position suitable for the user of the device. In a preferred embodiment of the present invention, the scanning beam adjustment lever is mounted on the underside of keyboard 1. However, it is also contemplated that the lever can be mounted on the top or side of keyboard 1, or any suitable location providing the user with the ability to conveniently position the scanning beam as desired.

In alternative embodiments of the present invention a CCD or 3D laser scanner (not shown) may be employed. The scanning beam adjustment lever is not necessary to pivot the CCD or 3D laser scanner, as the pivoting of these scanners is accomplished internal to the scanning engine (not shown). The lever may be provided however to facilitate the initial positioning setup of the scanning device.

When a pivotable mounting of the laser scanning engine is provided, the lens 12 preferably pivots to accordingly ensure that the scanning beam is not reflected back to the scanning engine. Therefore, it is preferred that the optical scanner 2 is constructed so that the scanning engine and lens 12 adjust simultaneously, to ensure the proper angle of incidence between the laser and lens. Additionally, as appreciated by those skilled in the art, various coatings may be applied to the lens to vary the reflection coefficient as desired. The required angle of incidence is dependent upon both the distance between the optical scanner 2 and the lens 12 and on the lens material. The required angle of incidence is published in Symbol Technologies' handbook for Symbol Technologies' SE1200 series scanning engines.

The mechanical and electrical interface of the present invention provides an integrated QWERTY or POS keyboard 1 in which a plurality of input functions, including a keyboard 1 and optical scanner are provided in a single integrated unit. The integration of the present invention provides significant advantages in reducing external interconnections, reducing system size, reducing cost, and increasing system reliability. While the present invention has been disclosed in terms of a keyboard 1 integrated with an optical scanner, a touch pad 19, a smart card reader and/or a credit card reader 3, it will be appreciated that other combinations of POS devices, such as printers, check readers, and display units can be similarly integrated and are contemplated by the present invention.

As illustrated in FIGS. 1a, 1b and 1c, keyboard 1 preferably includes keys arranged in a QWERTY configuration with the addition of two rows of twelve function keys 13 at the top of the keyboard 1 and a block of eighteen keys 14 on the right side of the keyboard commonly used as a numeric keypad. Preferably, any or all of the keys may be programmable. Also, any of the keys may be programmed to serve as a scanner trigger switch. Additionally, keyboard 1 preferably includes a keyboard lock 16 which can switch the keyboard 1 from a QWERTY configuration to a fully programmable keyboard configuration. The Keyboard lock 16 may be covered by a label, or similar panel, when not provided. Additionally, keyboard 1 desirably includes a plurality of tapered holes 15 designed to accept pens or pencils.

Keys 13,14 are preferably conventional type key switches, commercially available from a variety of manufacturers for example Alps of Japan or KTP of Taiwan. In the preferred QWERTY configured keyboard 1 embodiment, the twelve function keys 13 at the top of the keyboard are fully programmable. Alternatively, all of the keys may be fully programmable.

Keyboard lock 16, if incorporated in the keyboard, is also preferably of a conventional key lock rotary type, widely available commercially from many manufacturers, for example SAIA-Burgess Electronics of Buffalo Grove, Ill. or Oslo Switch of Chesire, Conn. As discussed above, keyboard lock 16 may have two or more positions. Each position defines a totally new set of programmed key definitions. For example, with a three position keyboard lock, position 1 may define a null keyset with no output, representing a lock-out position. Position 2 may define a normal cashier keyset and position 3 may define a special keyset, for example, to allow a supervisor to override any function such as sales price.

FIGS. 5f, 5l and 5r illustrate the rear of the keyboard 1 which preferably includes four electrical connectors, shown collectively as 40. Specifically a 10 pin RJ11 connector (for connection to the removable credit card reader), a 6 pin RJ11 connector (for connection to computer keyboard port), a PS2 DIN connector (for downstream daisy chained devices), and an RS232 connector (output serial port). All connectors are accessible through a detachable connector panel with matching holes. If different interfaces are required, such as USB (universal serial bus) a simple change of the connector panel and printed board is needed without changing the expensive plastic tooling of the case.

Figure 7:
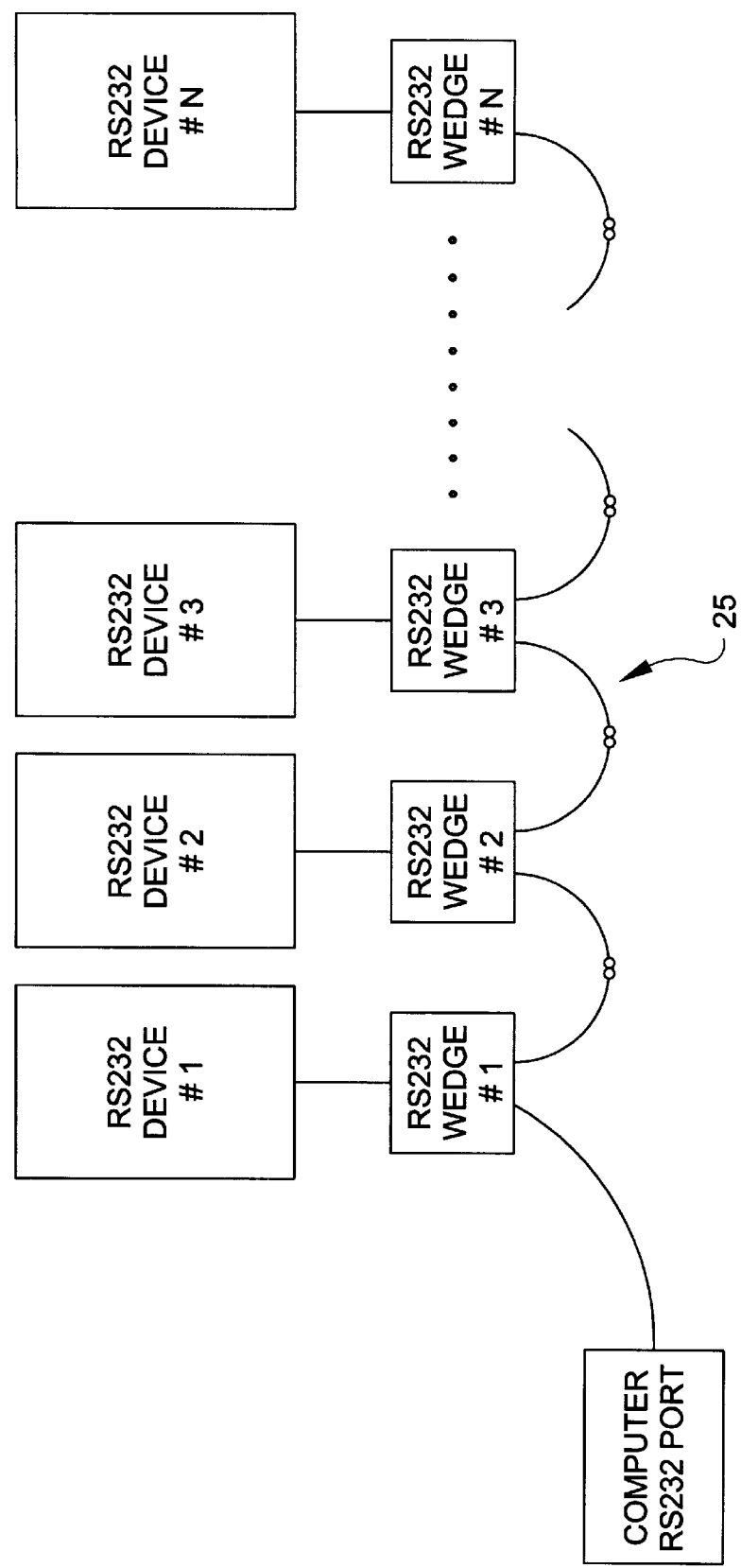
FIG. 7 is a block diagram of a POS system in a daisy chain configuration utilizing external wedge interface cables.

Preferably, each of the other POS input devices, i.e. credit card reader 3, optical scanner 2, touch pad 19 or smart card reader is connected in a serial, daisy chain configuration, downstream from keyboard 1 by using an intelligent keyboard wedge interface 26 (as shown in FIG. 4) which converts the RS232 serial data format of the other input device into standard keyboard data format, the keyboard 1 being directly connected to a computer. The wedge interface 26 is preferably internally housed within the keyboard 1, but alternatively may be part of the device cable connection 25 as shown in FIG. 7 (i.e., external to the credit card reader 3, optical scanner 2, touch pad 19 or smart card reader).

FIG. 4 is a simplified block diagram illustrating a typical electrical interface between keyboard 1 and optical scanner 2 (or magnetic card reader 3, touch pad 19 or smart card reader). In this simplified interface, it is assumed that both the keyboard 1 and optical scanner module 2 (or magnetic card reader 3, touch pad 19 or smart card reader) provide a keyboard wedge interface 26 compatible with the keyboard input port of the POS system or computer, such as the keyboard wedge interface, described in U.S. patent application Ser. No. 08/899,290, incorporated by reference herein and a copy of which is also attached as Appendix A. The integrated keyboard of the present invention includes a control circuit 8 interposed between the optical scanner module 2 (or magnetic card reader 3, or smart card reader) and the keyboard bus of the POS system or computer.

As illustrated in FIG. 4, the wedge interface circuit 26 is shown functionally as including a pair of electrically controllable switches 9, 10 and an interface control circuit 8. The switches 9, 10 are responsive to control signals received from the control circuit and may either be in a pass-through state (default) or may be in a transmit state, selectively connecting one of the keyboard 1, or optical scanner module 2 (or other input peripheral device(s)) to the system keyboard bus. When the credit card reader 3, optical scanner 2, touch pad 19 or smart card reader has no data available for transmission, the switches 9, 10 will be in the default pass-through state (as shown in FIG. 4).

A credit card reader 3, optical scanner 2, touch pad 19 or smart card reader, configured with the switches 9, 10 in the pass-through state function as a conduit through which data may freely pass, thereby allowing other input peripheral devices to communicate directly with the computer. When the switches 9, 10 are in the transmit state, all downstream devices which are connected to the particular input device (i.e., those input devices that are connected further away from the computer in the keyboard daisy chain) are electrically disconnected from the data bus and the optical scanner 2 (or credit card reader 3, touch pad 19 or smart card reader), is enabled for communication with the computer.

If the optical scanner 2 (or credit card reader 3, touch pad 19 or smart card reader) has data to be transmitted to the computer, the interface will first monitor the traffic on the data bus to determine if another input device is presently communicating with the computer. Preferably, only one input device may communicate with the computer at any given time, thus avoiding bus contention problems which may otherwise occur. Therefore, when the optical scanner 2 (or credit card reader 3, touch pad 19 or smart card reader) is communicating with the computer, all other input devices will preferably monitor the bus and maintain their pass-through configuration, regardless of whether or not they have data to transmit.

When the bus is available for transmission (i.e., a break has been detected), the interface circuit of the optical scanner 2 (or credit card reader 3, touch pad 19 or smart card reader) will change the state of the switches 9, 10 so as to electrically disconnect the downstream input devices from the data bus, thereby allowing the optical scanner 2 (or credit card reader 3, touch pad 19 or smart card reader) to transmit its data to the computer. While transmitting its data, the upstream input devices (i.e., those peripheral input devices that are connected closer to the computer in the serial keyboard daisy chain) monitor the bus and maintain their pass-through state. After the optical scanner 2 (or credit card reader 3, touch pad 19 or smart card reader), has completed its data transmission, the interface control circuit 8 changes the state of the switches 9, 10 back to the default pass-through state.

If an optical scanner 2 (or credit card reader 3, touch pad 19 or smart card reader) has data to be transmitted to the computer and the data bus is busy, the interface control circuit 8 will preferably store the data from the optical scanner 2 (or credit card reader 3, touch pad 19 or smart card reader), for example in memory, until the keyboard completes the current data transfer. Once the bus becomes available, the stored data from the interface control circuit 8 is subsequently transmitted to the computer in the manner described above.

Preferably, the keyboard wedge interface circuit 26 performs a conversion of the data it receives from the optical scanner 2 (or credit card reader 3, touch pad 19 or smart card reader) for example RS232 format, into standard keyboard data format. Using this approach, all input peripheral devices will be communicating with the computer in a compatible data format (i.e., keyboard data format). This eliminates the need for a computer having multiple interface cards, one for each data format used.

When the wedge interface circuit 26 is not communicating with the computer, it preferably monitors and records all activities between the keyboard 1 and the computer. For example, if the "Caps Lock" key is pressed, the interface circuit 26 will make the proper case inversion such that the computer always receives the correct characters from the optical scanner 2 (or credit card reader 3, touch pad 19 or smart card reader). The wedge interface circuit 26 also preferably supports bidirectional dialog with the computer if the standard keyboard is not present or is not functioning properly. This allows the computer to function without generating a "Keyboard Error" interrupt, even if the standard keyboard and/or input peripheral devices are not installed.

The wedge interface circuit 26 may be formed as an external unit, preferably integrated with the peripheral device cable 25 as shown in FIG. 7. A suitable example is the Logic Controls Intelligent Wedge Cables model IW3000M3. This cable allows standard (i.e., off-the-shelf) point-of-sale peripheral devices that do not output data in standard keyboard format, and do not have an internal wedge interface of their own, to be used with a POS system such as described in Appendix A, with or without the keyboard 1 of the present invention. An exemplary external wedge interface circuit 26, formed in accordance with the present invention, is illustrated in the electrical schematic diagram of FIG. 6.

In the preferred embodiment, the wedge interface circuit 26 performs keyboard and optical scanner and magnetic stripe card reader (and smart card and touch pad) signal processing. The central processing units 22, 32 perform keyboard and optical scanner signal processing and magnetic stripe card reader signal processing, respectively.

Figure 6A:
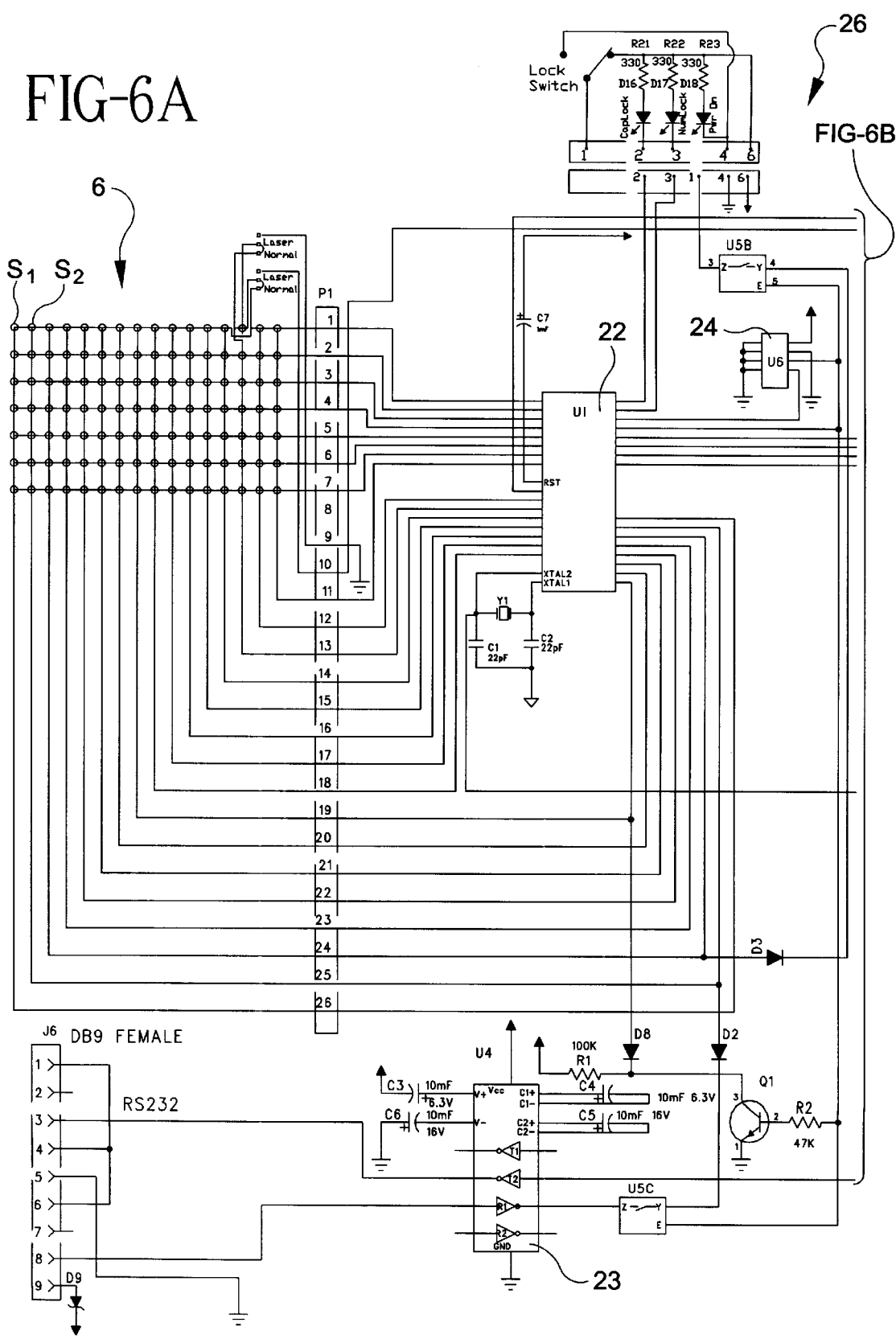
FIG. 6 is an electrical schematic diagram of an exemplary wedge interface circuit, formed in accordance with the present invention, and depicted by the block diagram of FIG. 4.
Figure 6B:
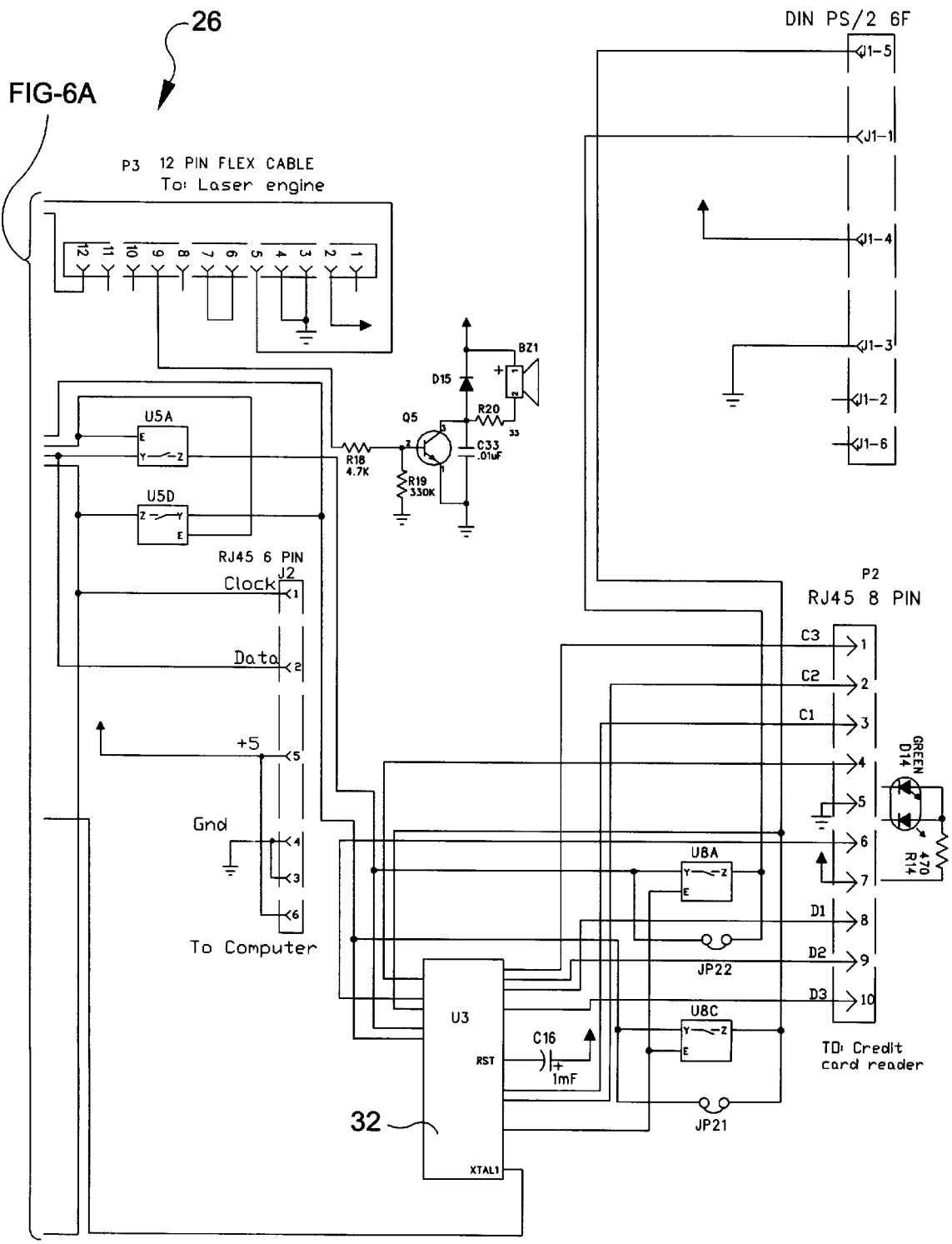

FIG. 6 illustrates that keyboard input data is input from the 7×16 key switch matrix 6. The seven (7) horizontal keyboard matrix lines of key switch matrix 6 represent the keyboard scan lines and the sixteen (16) vertical keyboard matrix lines of key switch matrix 6 represent the keyboard sense lines. If a key switch S1, S2, . . . Sn is pressed, the sense line receives the pulse signal from the scan line at the intersection. The firmware within central processor 22 looks up the keyboard scan code that corresponds to the depressed key switch S1, S2, . . . Sn.

Central processor 22 also monitors and receives serial ASCII data from the optical scanner 2 output and converts the ASCII data to keyboard scan code data and merges it with the data from keyboard 1. Alternatively, central processor 22 may output the combined data in a serial ASCII format. Central processor 23 receives such data and outputs the data to interface circuit connector 28, preferably an RS232 connector. Memory chip 24 is an EEPROM memory IC holding programed definition of each key switch S1, S2, . . . Sn.

Central processor 32 receives raw magnetic stripe reader data and converts and decodes the raw data into keyboard scan code. The keyboard scan codes from central processors 22, 32 are wedged together as discussed by the attached Appendix A.

Figure 3A:
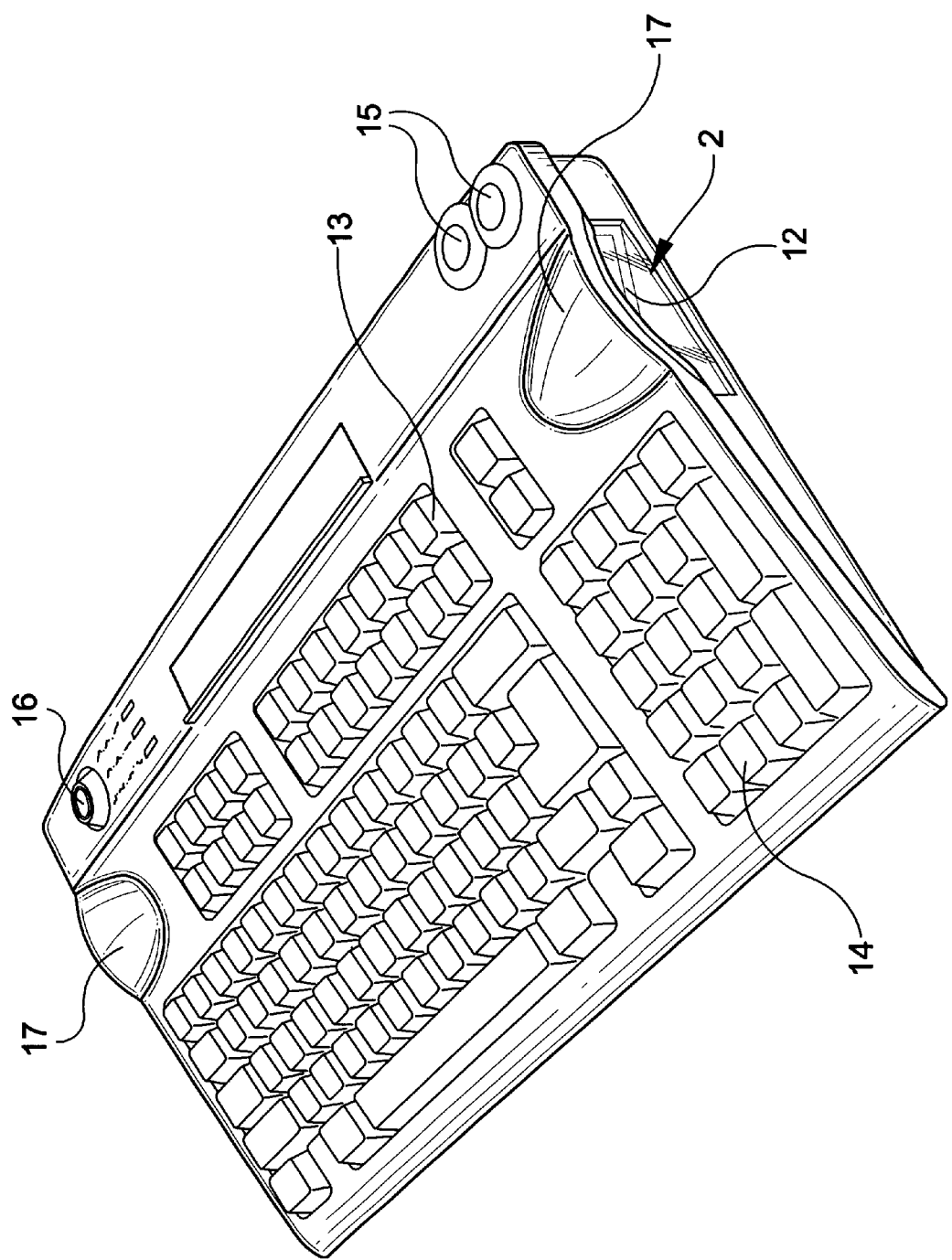

In an alternative preferred embodiment of the present invention including a credit card reader 3 the electromechanical mounting of the credit card reader 3 should take the form of a removably engagable connector system as shown in FIGS. 1a, 1b and 1c. When the credit card reader 3 is removed the mounting location may include a cover 18, as illustrated in FIGS. 3a and 3b. The credit card reader 3 may be modified by tilting the unit forward, on its horizontal axis approximately twenty degrees more than shown in FIGS. 1a, 1b, 1c, 2a 2b and 2c, to reduce the collection of debris on the magnetic head of the card reader 3; to affect easier insertion of the magnetic card; and to eliminate possible interference of the card with a pen or pencil in the pencil holders 15.

In the preferred embodiment of the present invention, the electro-mechanical mounting of the touch pad 19 should take the form of a removably engagable connector system as shown in FIGS. 1a, 1b and 1c. The touch pad 19 may be mounted at mounting location 21, on the left side of the keyboard 1 (not shown) or at mounting location 20 on the right side of the keyboard 1 (for example, an RS232 connector), as shown in FIGS. 2c and 3c. In alternative embodiments, the touch pad 19 may be mounted in other locations on the keyboard 1, including the back of the keyboard 1 above function keys 13, or the front of the keyboard 1 under the space bar. In an alternative embodiment of the present invention, touch pad 19 may take the form of a trackball or other comparable pointing device (not shown) or other similar pointing device known by those skilled in the art.

In still another alternative embodiment of the present invention, a smart card reader (not shown) may be removably mounted to the keyboard 1 at mounting locations 20 and 21, as shown in FIG. 2c on either the right or left side, respectively, of the keyboard 1. A smart card reader can alternatively be integrated with touch pad 19. The magnetic card reader 3 or smart card reader may take the form of modular electronic sub-assemblies. In this manner, the card reader 3 and/or smart card reader can be readily removed or replaced by the user as desired, thereby adapting the keyboard to the particular application.

While the principles of the invention have now been made clear in illustrated embodiments, it will be clear to those skilled in the art that many modifications of structure, arrangement and components can be made which are particularly adapted for specific environments and operating requirements without departing from those principles. The appended claims are therefore intended to cover and embrace any such modifications, within the limits only of the true spirit and scope of the invention.

I claim:

1. A keyboard, the keyboard comprising:
   a housing, the housing holding and partially enclosing keyboard keys, as well as electronic circuitry associated with the keyboard keys, the housing integrally and at least partially enclosing and supporting an optical scanner, whereby wiring is located internally between the housing and the optical scanner; and an output, the output being responsive to the electronic circuitry associated with the keyboard keys, the output being further responsive to the optical scanner, and the output being able to be electrically coupled to a separately housed computer;
   wherein the housing includes external dimensions, said external dimensions being substantially the same as external dimensions of at least one of a standard QWERTY computer keyboard and a standard point-of-sale (POS) computer keyboard.

2. A keyboard as defined in claim 1, further comprising a wedge circuit enclosed within said housing, the wedge circuit interfacing the optical scanner and the electronic circuitry associated with the keyboard keys with the computer, the wedge circuit avoiding bus contention between the electronic circuitry associated with the keyboard keys and the computer, the wedge circuit avoiding bus contention between the optical scanner and the computer.

3. A keyboard as defined in claim 1, wherein the optical scanner includes at least one of a laser scanner, a charge coupled device (CCD) scanner, an optical character recognition (OCR) scanner, and a light emitting diode (LED) scanner.

4. A keyboard as defined in claim 3, wherein the laser scanner includes at least one of a one-dimensional laser scanner, a two-dimensional rastering laser scanner, and an omni-directional laser scanner.

5. A keyboard as defined in claim 1, wherein the optical scanner includes a pivotable mounting, the pivotable mounting enabling the optical scanner to be rotated in at least one of three planes.

6. A keyboard as defined in claim 1, wherein the optical scanner includes a pivotable mounting, the pivotable mounting including a gimbal, the gimbal enabling the optical scanner to be positioned in at least one of three planes.

7. A keyboard as defined in claim 1, wherein the optical scanner includes a mounting cup, the mounting cup including a ball housing, the ball housing holding the optical scanner, the mounting cup enabling the optical scanner to be positioned in at least one of three planes.

8. A keyboard as defined in claim 1, further comprising a magnetic card reader and a wedge circuit, the wedge circuit being enclosed within said housing, the wedge circuit interfacing the magnetic card reader with the computer, the wedge circuit avoiding bus contention between the magnetic card reader and the computer, the magnetic card reader including an output able to be electrically coupled to the computer.

9. A keyboard as defined in claim 1, further comprising a smart card reader and a wedge circuit, the wedge circuit being enclosed within said housing, the wedge circuit interfacing the smart card reader with the computer, the wedge circuit avoiding bus contention between the smart card reader and the computer, the smart card reader including an output able to be electrically coupled to the computer.

10. A keyboard as defined in claim 1, further comprising a touch pad and a wedge circuit, the wedge circuit being enclosed within said housing, the wedge circuit interfacing the touch pad with the computer, the wedge circuit avoiding bus contention between the touch pad and the computer, the touch pad including an output, the output able being able to be electrically coupled to the computer.

* * * * *

UNITED STATES PATENT AND TRADEMARK OFFICE
CERTIFICATE OF CORRECTION

PATENT NO. : 6,312,175 B1
DATED : January 28, 2002
INVENTOR(S) : Jackson Lum

Page 1 of 1

It is certified that error appears in the above-identified patent and that said Letters Patent is hereby corrected as shown below:

<u>Title page,</u>
In *Attorney, Agent, or Firm*, now reads "Hoffman & Baron, LLP"; this should read -- Hoffmann & Baron, LLP --.

<u>Column 2,</u>
Line 56, now reads "...and gols are realized..." should read -- ...and goals are realized... --

<u>Column 6,</u>
Line 10, now reads "...the canning engine to be..." should read -- ...the scanning engine to be... --

Signed and Sealed this

Sixteenth Day of April, 2002

Attest:

JAMES E. ROGAN
*Director of the United States Patent and Trademark Office*

*Attesting Officer*